(12) United States Patent
Metka et al.

(10) Patent No.: US 11,858,563 B2
(45) Date of Patent: Jan. 2, 2024

(54) AERODYNAMIC REAR FENCES FOR VEHICLES

(71) Applicant: Honda Motor Co., Ltd., Tokyo (JP)

(72) Inventors: Matthew L. Metka, Plain City, OH (US); David J. Rose, West Mansfield, OH (US); Benjamin Bowlby, Dublin, OH (US); Pirooz Moradnia, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 195 days.

(21) Appl. No.: 17/482,908

(22) Filed: Sep. 23, 2021

(65) Prior Publication Data
US 2023/0089642 A1   Mar. 23, 2023

(51) Int. Cl.
| | | |
|---|---|---|
| *B62D 35/00* | (2006.01) | |
| *B62D 37/02* | (2006.01) | |
| *B62D 5/00* | (2006.01) | |

(52) U.S. Cl.
CPC ............. *B62D 5/008* (2013.01); *B62D 37/02* (2013.01)

(58) Field of Classification Search
CPC ........ B62D 35/008; B62D 37/02; Y02T 10/82
See application file for complete search history.

(56) References Cited

U.S. PATENT DOCUMENTS

| | | |
|---|---|---|
| 3,690,220 A1 | 4/2014 | Tsukiyama et al. |
| 9,284,767 B2 | 3/2016 | Brandscheid et al. |
| 10,427,730 B2 | 10/2019 | Williams et al. |
| 2019/0382063 A1 | 12/2019 | McAfee et al. |
| 2020/0391806 A1 | 12/2020 | Franke et al. |
| 2021/0229759 A1* | 7/2021 | VanderSluis ......... B62D 35/008 |
| 2022/0242496 A1* | 8/2022 | McAfee ................. B62D 35/02 |
| 2022/0315134 A1* | 10/2022 | Moradnia ............ B62D 35/007 |
| 2022/0315135 A1* | 10/2022 | Moradnia ............ B62D 35/007 |

FOREIGN PATENT DOCUMENTS

| | | | | |
|---|---|---|---|---|
| CA | 3137582 A1 | * | 10/2020 | .......... B62D 35/007 |
| CN | 112203929 A | * | 1/2021 | .......... B62D 35/007 |
| DE | 102005050381 A1 | | 4/2006 | |
| DE | 102007032322 A1 | | 1/2009 | |
| DE | 10201820947 A1 | | 12/2019 | |
| EP | 3750787 A1 | * | 12/2020 | .............. B60J 5/107 |
| ER | 2892993 B1 | | 4/2009 | |
| FR | 2854858 B1 | | 6/2006 | |
| FR | 2854860 B1 | | 6/2006 | |
| FR | 2888199 B1 | | 8/2007 | |
| FR | 2892994 B1 | | 2/2008 | |
| FR | 2896759 B1 | | 4/2008 | |
| FR | 2909176 B1 | | 2/2009 | |

(Continued)

*Primary Examiner* — Lori Lyjak
(74) *Attorney, Agent, or Firm* — Plumsea Law Group, LLC

(57) ABSTRACT

Rear fences and a system for deploying the rear fences on a vehicle are described. The rear fences are disposed inboard of and spaced apart from the rear pillars. The rear fences may be folded against the rear panel of the vehicle when retracted and are rotated to a central position in a deployed position. The system includes a deployment control system including controller logic having at least one processor and a memory storing instructions for implementing deployment and retraction of rear fences on a vehicle.

20 Claims, 18 Drawing Sheets

(56) References Cited

FOREIGN PATENT DOCUMENTS

| | | | | |
|---|---|---|---|---|
| FR | 3060513 | B1 | 10/2019 | |
| FR | 3113276 | A1 * | 2/2022 | ........... B62D 35/007 |
| WO | 2005105555 | A1 | 11/2005 | |
| WO | 2007138212 | A1 | 12/2007 | |
| WO | 2019129836 | A1 | 7/2019 | |
| WO | 2020023868 | A1 | 1/2020 | |
| WO | 2020219438 | A1 | 10/2020 | |

* cited by examiner

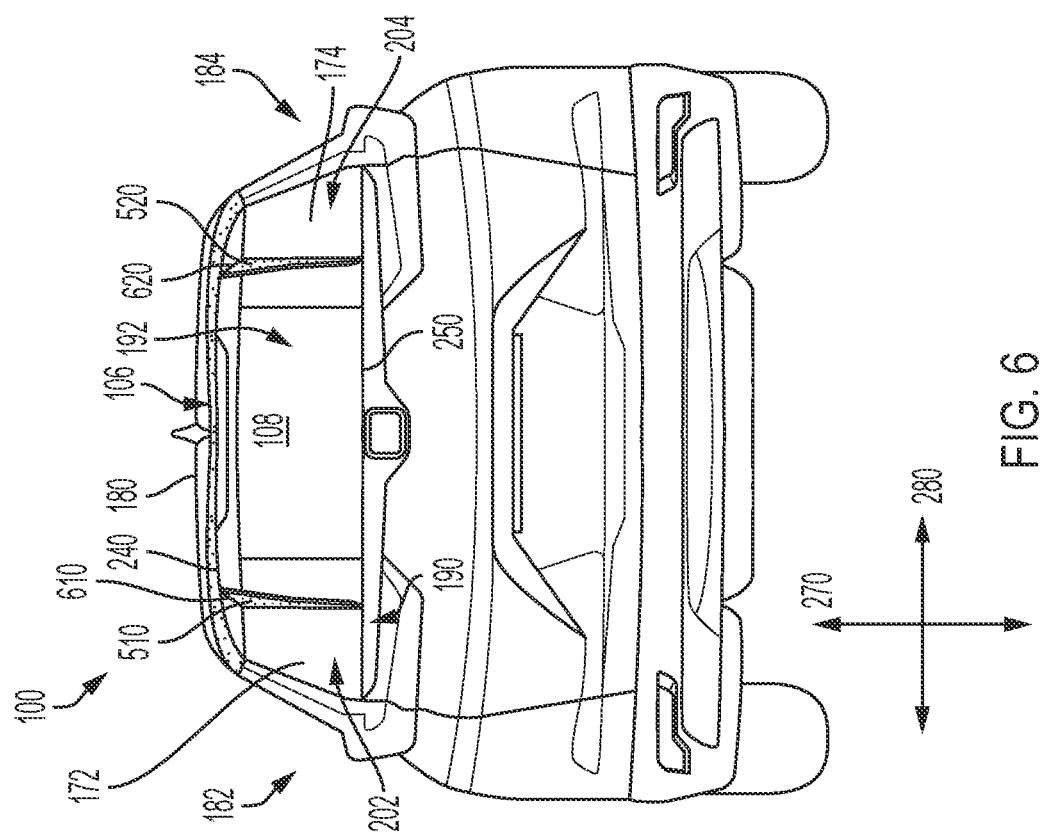

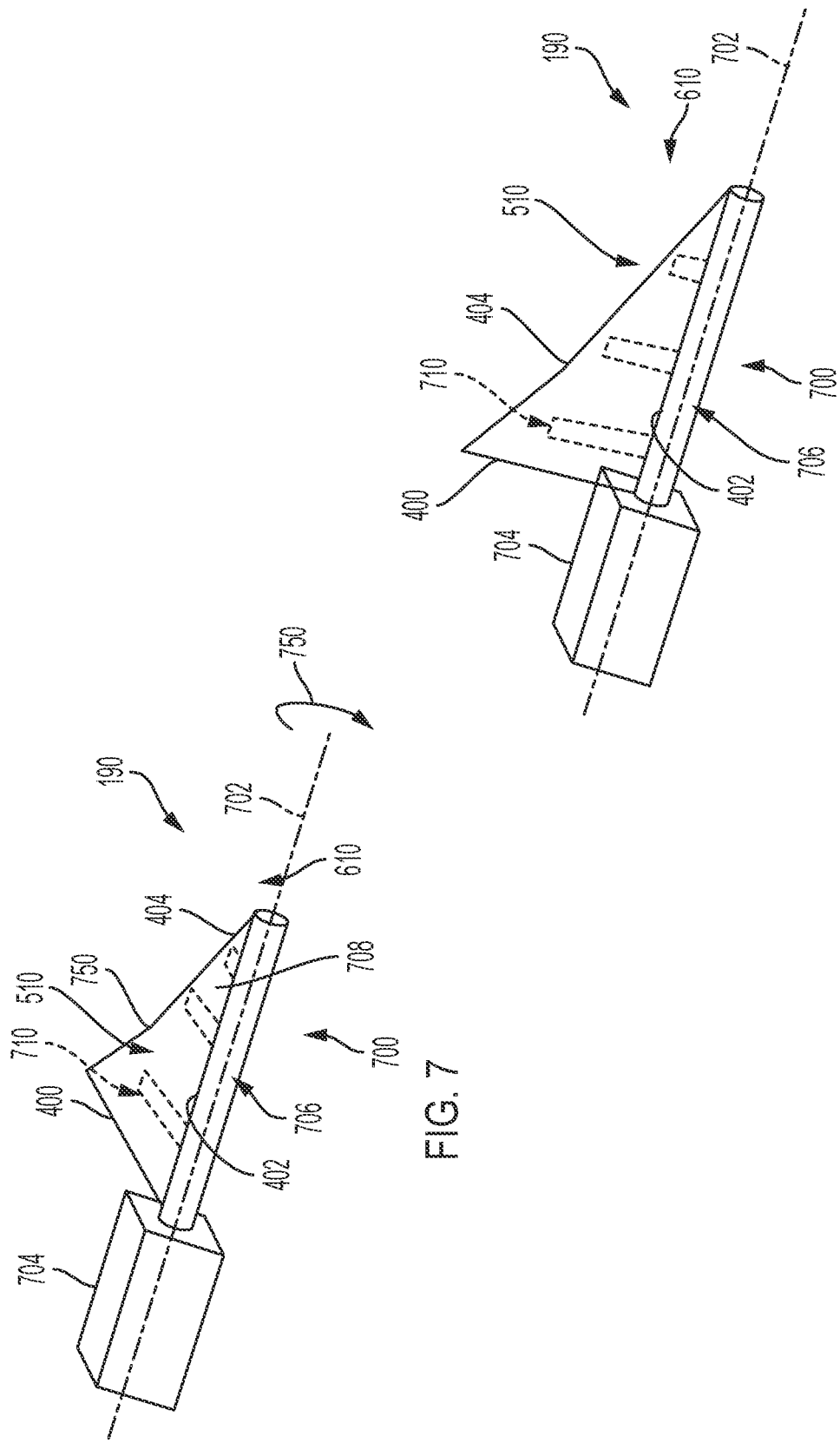

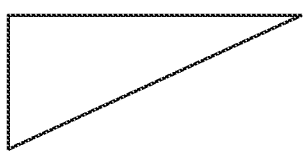
FIG. 10D
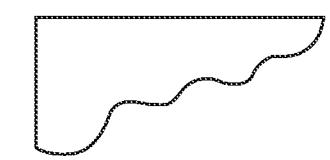
FIG. 10H
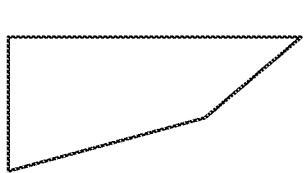
FIG. 10C
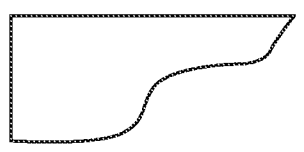
FIG. 10G
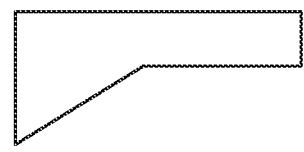
FIG. 10B
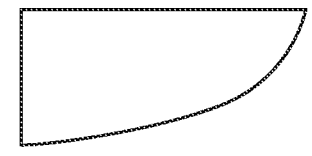
FIG. 10F
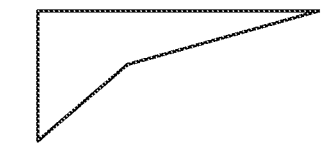
FIG. 10A
FIG. 10E

US 11,858,563 B2

AERODYNAMIC REAR FENCES FOR VEHICLES

BACKGROUND

The present disclosure generally relates to structures and systems for manipulating airflow around a vehicle, and, more particularly, to rear fence panels that improve aerodynamic performance.

Airflow around the rear of a vehicle can have a large impact on the aerodynamic drag and fuel economy. Conventional spoilers installed along the roof of a vehicle, or near the D-pillars of the vehicle, have been used to reduce drag. However, such approaches are limiting due to construction, durability, or styling image constraints.

There is a need in the art for a system that improves the aerodynamic performance of a vehicle.

SUMMARY

In one aspect, a vehicle is provided. The vehicle includes a rearward-facing surface that extends along the vehicle width from a first rear pillar to a second rear pillar. In addition, the rearward facing surface extends a (maximum) distance from an upper end and a lower end. The rearward-facing surface includes a first outboard region that is directly inboard relative to a first rear pillar, and a second outboard region that is directly inboard relative to a second rear pillar. The vehicle also includes a rear fence including a blade portion positioned on the rearward-facing surface to extend rearward therefrom. The blade portion is positioned inboard of the first outboard region, such that the blade portion is spaced apart from the first rear pillar, and the blade portion includes a first end positioned adjacent the upper end of the rearward-facing surface and a second end positioned at least a third of the distance from the upper end of the rearward-facing surface to the lower end.

In another aspect, an aerodynamic assembly for a vehicle is disclosed. The assembly includes a rear upper spoiler having an elongated body with an underside extending between a first end portion and a second end portion. The first rear fence and a second rear fence, wherein the first rear fence and second rear fence are each positioned beneath the underside of the rear upper spoiler, and inboard relative to the two end portions of the rear upper spoiler.

In another aspect, a method of routing or directing air flow along the rearward-facing surface of a vehicle is presented. The method includes a first step of deploying a first rear fence that extends from a first side portion of the rearward-facing surface such that the first rear fence rotates from a first orientation to a second orientation. A second step involves establishing a first aerodynamic zone along the first side portion between the first rear fence and an underside of a rear spoiler. A third step includes causing airflow to shift from a lateral direction to a substantially rearward and/or longitudinal direction as it moves through the first aerodynamic zone.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 5 is a rear-facing view of an example embodiment of a rear fence in a retracted position in accordance with aspects of the present disclosure;

FIG. 6 is a rear-facing view of an example embodiment of a rear fence in a deployed position in accordance with aspects of the present disclosure;

FIGS. 7 and 8 are schematic views of an example embodiment of a deployment mechanism for a rear fence in accordance with aspects of the present disclosure;

FIGS. 10A-10H are eight embodiments of some representative rear fence shapes in accordance with aspects of the present disclosure;

DETAILED DESCRIPTION

The rear fence panels according to the example embodiments described herein can be configured as static or active structures of a vehicle and offer reduced aerodynamic drag and improved aerodynamic performance. As will be discussed in detail below, the placement of the rear fences, each disposed on a rear panel portion (i.e., a rearward-facing exterior surface) between the rearmost pillar (e.g., the D pillar) and the outboard along the rear windshield and being spaced apart from typical styling surfaces, allow for greater freedom in the selection of an aerodynamic shape and size of the spoiler, including tapered portions. In some embodiments, a rear fence can extend in a substantially downward direction from a top portion near the conventional spoiler to a bottom portion near the lowermost edge of the rear windshield. Furthermore, in a non-limiting example, the rear fences can be configured as active systems that may be deployed while the vehicle is moving at a predetermined speed to improve aerodynamic performance and may be retracted or stowed when the vehicle is parked or operating at low speeds to improve styling appearance. Such a system is particularly useful in cases where a cleaner aesthetic appearance for the vehicle is desired when the vehicle is parked or being driven at low speeds.

Figure 1:
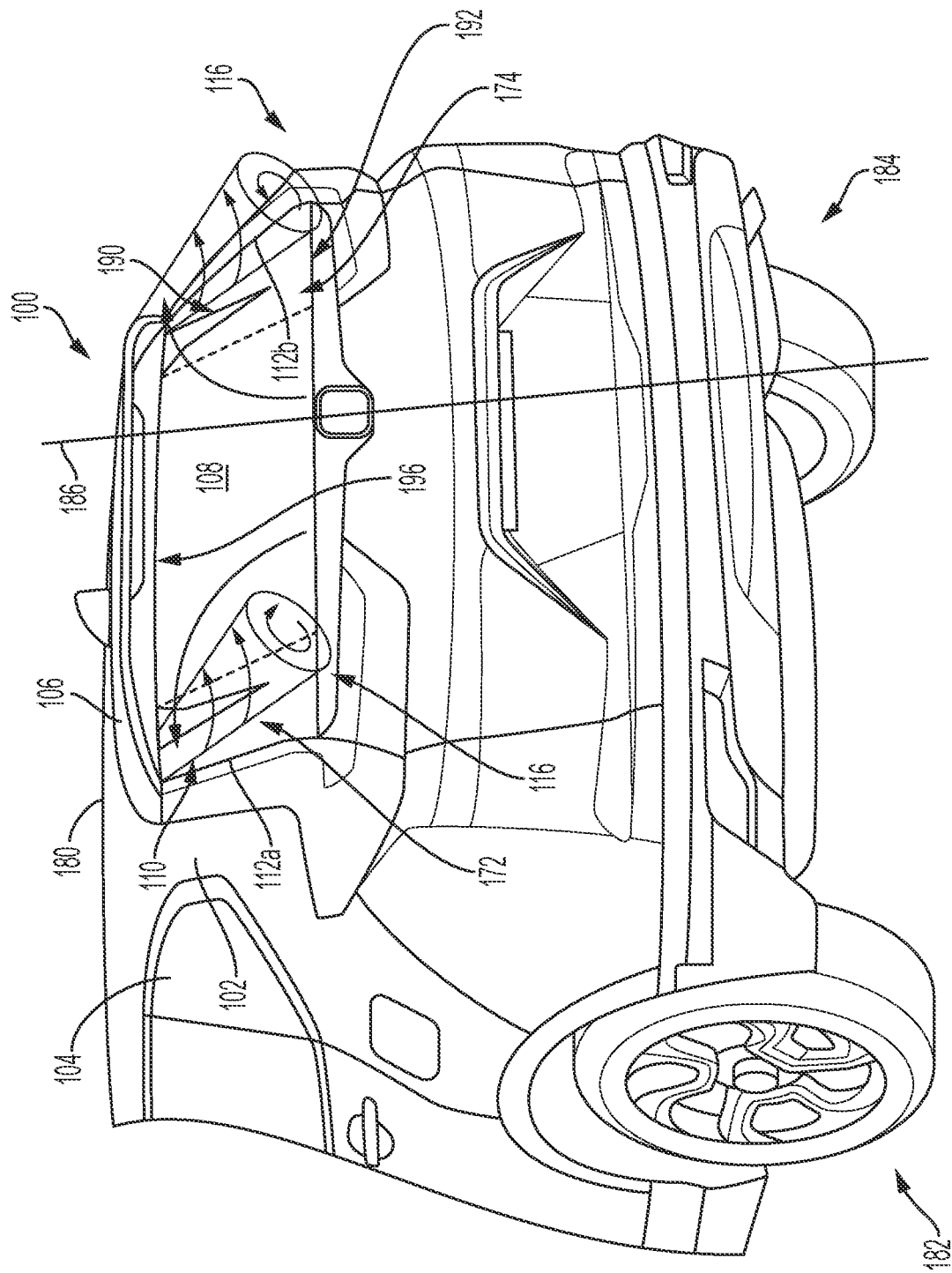
FIG. 1 is a representative view of an example embodiment of a rear fence in a retracted position in accordance with aspects of the present disclosure.

Referring now to FIG. 1, a vehicle 100 on which example embodiments of rear fence panels (referred to herein as "rear fences" or "rear fence blades") may be installed is shown. In an example embodiment, vehicle 100 is a sport utility vehicle (SUV), however, it should be understood that the example embodiments may be used with any type of vehicle having a rearward-facing surface, herein referred to interchangeably as a rear panel. In general, the rear panel can comprise an area extending between the rearmost set of vehicle pillars (e.g., the C pillars in standard sedans and hatchbacks, and the D pillars in station wagons, SUVs, mini-vans, and other multi-purpose vehicles). The rear panel can also include the rear window or rear windshield of the vehicle. Although the term "rear window" or "rear windshield" may be used herein for purposes of convenience when describing the rear panel, it may be understood that the proposed embodiments may also be implemented on vehicles that do not include windows along their rearward-facing surface.

As a general matter, each pillar is a vertical or near vertical support structure located at the rearmost portion of the vehicle body behind the rear doors of the vehicle. In contrast, the vehicle's A pillar is located on either side of the vehicle's front windshield, the B pillar is located between the front doors and rear doors, and the C pillar is located directly behind the rear doors. The D pillar, in vehicles including the D pillar, is located further towards the rear of the vehicle than the C pillar. For ease of reference throughout this disclosure, C pillars (in vehicles where there are only A, B, and C pillars), D pillars (in vehicles with A, B, C, and D pillars), and E pillars (in vehicles with A, B, C, D, and E pillars) will be identified more simply as the rearmost ("rear") pillars of the vehicle.

In embodiment of FIG. 1, vehicle 100 includes a rear pillar 102 located at the rear of vehicle 100 behind a quarter glass window 104 on one side of vehicle 100. While not shown in this embodiment, vehicle 100 also includes a corresponding rear pillar located on the opposite side of vehicle 100. In an example embodiment, vehicle 100 also includes a rear upper spoiler 106 located above an optional rear window 108 of vehicle 100 (represented here in dotted lines). In embodiments in which the proposed devices are implemented in a vehicle without a rear upper spoiler, the reference to an upper spoiler that occur below may be understood to refer to the rearmost edge of the roof of the vehicle (e.g., in the case of an SUV) and/or the uppermost edge of the trunk of the vehicle (e.g., in the case of a sedan).

As shown in FIG. 1, a pair of rear fences (or simply "fences") 190 of the present embodiments are in a stowed or retracted position located directly under the rear upper spoiler 106. In an example embodiment, the rear fences 190 are disposed on either side of a substantially vertical central axis 186 on a rear panel 192 of vehicle 100, and would also be disposed on either side of a central longitudinal axis running the length of the vehicle through its middle. In FIG. 1, rear panel 192 includes the rear window 108 disposed or extending between a first side portion 172 and a second side portion 174. In some embodiments, the rear panel 192 is adjacent to or part of the tailgate portion of the vehicle. Thus, one rear fence is disposed on the first side portion 172, and the other rear fence is disposed on the second side portion 174 of the rear panel 192. In one example, the rear fences are positioned between the rear pillar and rear window.

In some embodiments, the fences are disposed near or adjacent to a first trailing edge 112a and a second trailing edge 112b (collectively referred to as trailing edges 112) of the rearmost pillars, running along the perimeter of rear window 108, and directly adjacent to the rearmost pillar. In other embodiments, they may be spaced further apart from the trailing edge 112 (i.e., closer to rear window 108) of the nearest rear pillar, and disposed further inward or closer toward a central axis, as shown in the figures. In one embodiment, the rear fence is spaced apart at least 20 mm from the neighboring rear pillar. In the stowed configuration, a body (blade) portion, which may also be referred to as a panel portion, of the rear fence is substantially aligned with the plane in which an upper panel edge 196 of the rear panel 192 extends, or in this case with a lateral axis. In contrast, in the deployed configuration, the body of the rear fence lies in a plane substantially aligned with the sides of the vehicle, or in this case longitudinal axis 290 (see FIG. 2), to serve as a lengthening element of the car's length from front to back.

It should be understood that while the illustrated embodiments depict the fences being disposed adjacent to the rear pillars, in other embodiments where the rearmost pillars are not directly adjacent to the rear facing surface of the vehicle (e.g., where a rear window 'wraps' around one or both of the rear ends of the vehicle) the rear fences can extend directly from the surface of the rear window, or on a structural portion integrated into the window region for supporting the rear fence. In other words, the rearmost pillar is identified primarily for purposes of convenience in describing the approximate location of the proposed fence structure. Similarly, while rear spoilers are predominantly positioned at the top edge of a vehicle roof, in cases where the rear spoiler is lower (e.g., a sedan where the spoiler extends from the lowermost region of the tailgate), the fences can be disposed higher than the rear spoiler.

In an example embodiment, air flow through spaces or peripheral regions 110 formed on either side of the rear of vehicle 100 between a lower edge of rear upper spoiler 106 and trailing edges 112 may cause higher aerodynamic drag for vehicle 100. For example, reverse air flow along rear window 108 while vehicle 100 is moving may interact with the corner portions of peripheral regions 110 (i.e., the region where rear upper spoiler 106 and rear pillar 102 meet) to create end vortices 116 of air that reduce the overall effectiveness and/or aerodynamic performance of rear upper spoiler 106. In some cases, a vortex may form at each of the two corner ends of the rear upper spoiler, leading to a local drag penalty. In addition, it may be appreciated that the flow of air along this arrangement has a strong lateral-direction component and "pushes out" the body side wake.

Figure 2:
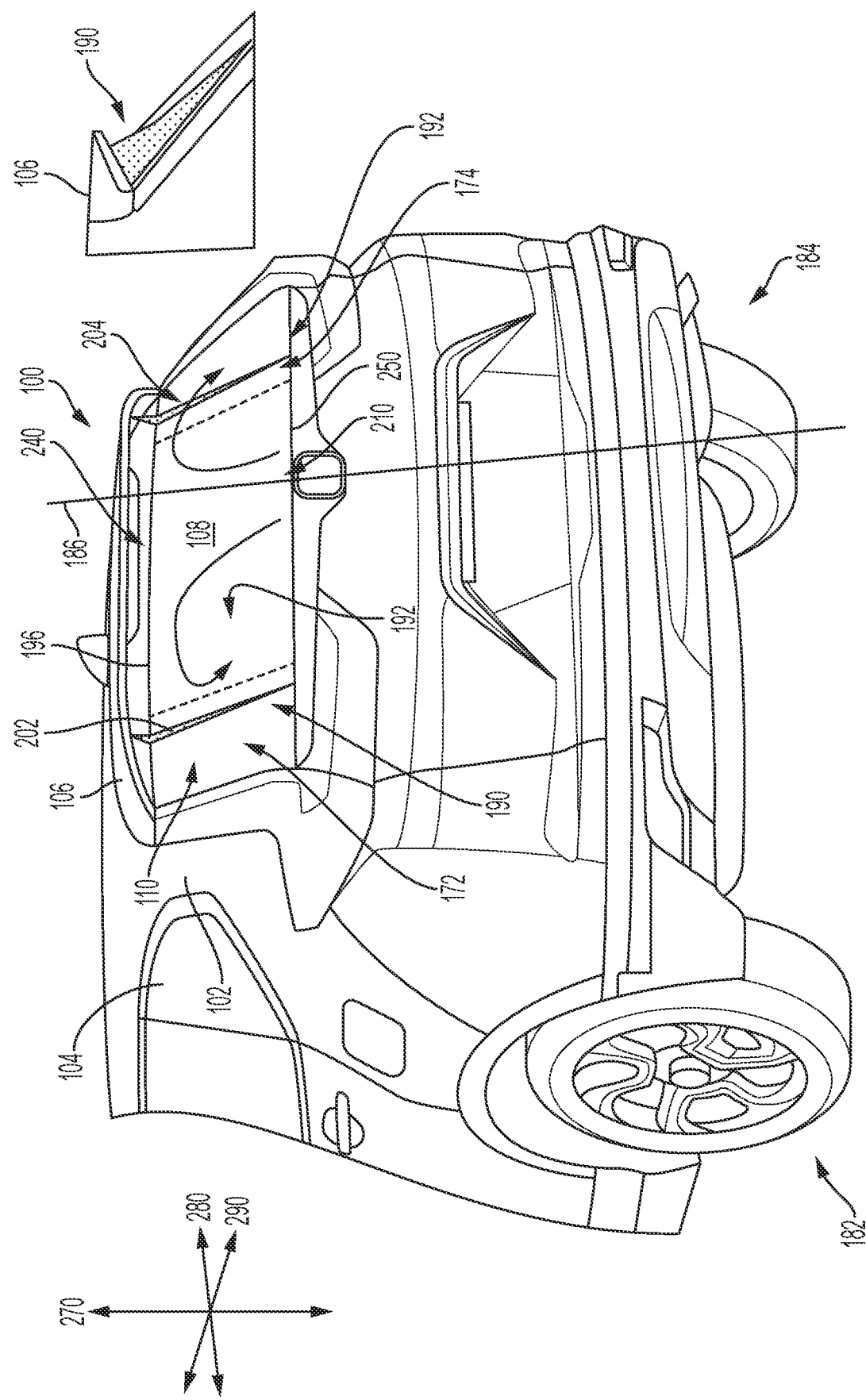
FIG. 2 is a representative view of an example embodiment of a rear fence in a deployed position in accordance with aspects of the present disclosure.

Referring now to FIG. 2, the rear fences of the present embodiments are shown in a deployed position. In this embodiment, rear fences 190 are shown disposed within peripheral regions 110 on either side of the rear of vehicle 100. More specifically, a first rear fence ("first fence") 202 installed or mounted on first side portion 172 extends downward from an underside of rear upper spoiler 106 toward a lower panel edge 250, and a second rear fence ("second fence") 204 installed or mounted on second side portion 174 extends downward from the underside of the rear upper spoiler 106 toward lower panel edge 250. As a general matter, the rear upper spoiler 106 extends from a rearmost edge of the roof of the vehicle to a rearmost edge 240.

Lower panel edge 250 in this case refers to the edge running in a substantially lateral direction along the lower perimeter of rear window 108. Thus, as shown in FIG. 2, vehicle 100 includes two rear fences 190, one on each side of vehicle 100. Additional details regarding the arrangement of the components of the rear fence assembly will be presented with reference to FIGS. 11A and 11B below.

For clarity, the description makes reference to a set of axes. As a general matter, the term "longitudinal axis" as used throughout this detailed description and in the claims refers to an axis that extends in a longitudinal direction, which is a direction extending the length of a vehicle (i.e., from the front of the vehicle to its rear, as shown with a longitudinal axis 290). Similarly, the term "lateral axis" as used throughout this detailed description and in the claims refers to an axis that extends in a lateral direction, which is a direction running a width of the vehicle. In the present case, the direction between the first side 182 and the second side 184 is aligned with a lateral axis 280. In addition, the term "vertical axis" as used throughout this detailed description and in the claims refers to an axis that extends in a vertical direction, which is a direction running from the floor to the roof structure of a vehicle. In this case, the vertical central axis 186 is aligned with a vertical axis 270. Each axis of the three axes may be understood to be orthogonal relative to the other two axes.

Furthermore, the description makes reference to distal and proximal directions (or portions). As used herein, the distal direction is a direction outward or oriented away from a reference component or further from the reference component. Also, the proximal direction is a direction oriented toward a reference component or nearer to the reference component. Thus, a distal side or region refers to a portion of a component that is disposed further from a reference component and a proximal side or region refers to a portion of a component that is disposed nearer to a reference component. In addition, a medial direction or portion refers to a portion of a component that is closer to a middle of the vehicle.

In an example embodiment, rear fences 190 are deployed from the stowed or retracted position substantially flush against the surface of the rear panel 192 (see FIG. 1) and aligned with lateral axis 280 to the deployed position shown in FIG. 2, where the fences are substantially aligned with longitudinal axis 290. For example, in some embodiments, rear fences 190 are deployed using a deployment mechanism (described below) that is configured to rotate or pivot the rear fences 190 from the stowed or retracted position against the rear panel 192 to the deployed position in response to vehicle 100 reaching a predetermined speed, a specific windspeed, a change in temperature above (or below) a particular threshold value, and/or a manual trigger. As noted above, in some other embodiments, the fences 190 may alternatively be configured as static structures that are configured to remain in the deployed position. In some embodiments, the height of a rear fence (extending away from the rear panel when deployed) can vary between approximately 50 mm-1500 mm. The height can be adjusted based on the specific vehicle's style, appearance, and observed airflow.

In an example embodiment, each rear fence 190 is substantially continuous or uninterrupted with the underside of rear upper spoiler 106 on each side when rear fences 190 are in the deployed position, forming a substantially contained U-shaped area. Inner surfaces of rear fences 190 (disposed on the sides closer to the rear window 108) face inwards towards each other when deployed. Rear fences 190 can thus serve as an extension of the rear upper spoiler 106 and each side portion in order to assist with attenuating the airstream vortices (e.g., end vortices 116, shown in FIG. 1) caused by airflows on rear panel 192.

For example, as shown in FIG. 2, rear airflow 210 travels outward toward rear upper spoiler 106 and rear fences 190 and is directed back downwards in a smooth manner, interacting with body-side air flow. Thus, the streamwise vortex (see FIG. 1) is minimized and rear panel air flow is redirected in the longitudinal direction. In this manner, the static pressure increases on rear panel 192 (e.g., along rear window 108) and act to improve aerodynamic performance overall by reducing aerodynamic drag on vehicle 100 as it is moving for example at or above a predetermined speed at which the rear fences 190 are deployed. With this arrangement, rear fences 190 provide aesthetically pleasing styling under parked and low speed conditions, while also providing improved aerodynamic performance at high speeds (e.g., at or above the predetermined speed, as will be described below). In other words, in some examples, the rear fences can be deployed to modify the airflow from the rear window and redirect it in the rearward direction for improved aerodynamics and lower drag. In some embodiments, the performance metrics from this particular positioning of the rear fence may offer greater aerodynamic benefits than traditional methods under similar constraints.

For example, with reference to both FIGS. 1 and 2, airflow around the rear panel can be redirected through implementation of the proposed embodiments, leading to reduced aerodynamic drag. In one embodiment, the rear fences can contain or compartmentalize high pressure exerted on the rear panel (including the rear window glass) by creating a cavity or pocket encompassed by the rear fence, the rear window, and the upper spoiler. More specifically, airflow on the rear panel can then be redirected from a primarily lateral direction (see FIG. 1) to a rearward longitudinal direction (see FIG. 2) to improve pressure on the rear window and/or other rear panel components. In addition, the proposed assembly is configured to minimize the lateral mixing between the high-speed longitudinal body side flow and the laterally moving rear window flow, which in turn reduces mixing losses and end-region vortex strength (see FIG. 1). Furthermore, an additional benefit is the flexibility provided by such an assembly. For example, the shape or texture of the rear fence's outer surface need not be aerodynamically smooth (unlike a traditional D pillar spoiler, which are limited by feasibility and/or styling constraints). In one example, the rear fence has an outer surface that includes ridges or other aerodynamic texturing. Thus, these rear fence devices can be positioned further inboard relative to traditional D pillar spoilers. In addition, in some embodiments, the proposed embodiments can create or otherwise form a seal with the rear panel. The effects of the rear fence can be changed by modifying variables such as their tolerance to the rear window, the vertical height of the rear fence, the proportion of the rear window along with the rear fence extends, and the angle of the inboard edge of the fence surface.

In different embodiments, rear fences 190 may in the form of a pane, flap, panel, or rigid sheet piece having a shape and dimensions configured to extend the length of the side portion from the upper panel edge 196 to the lower panel edge 250. In some embodiments, a spoiler may have a substantially triangular, rectangular, trapezoid, rhombus, or other quadrilateral shape, as well as other regular or irregular shapes. In different embodiments, the dimensions of the panel may vary, depending on the shape and/or configuration of the rear pillars and rear upper spoiler on the vehicle. In different embodiments, the panels forming rear fences 190 may be made from a variety of materials, including, but not limited to: solid materials, such as metal, carbon fiber, fiberglass, or rigid plastic, flexible materials, such as fabrics, rubber, or bendable plastics, and/or combinations thereof. In one embodiment, the fences or portions thereof comprise an injection molded plastic.

Figure 3:
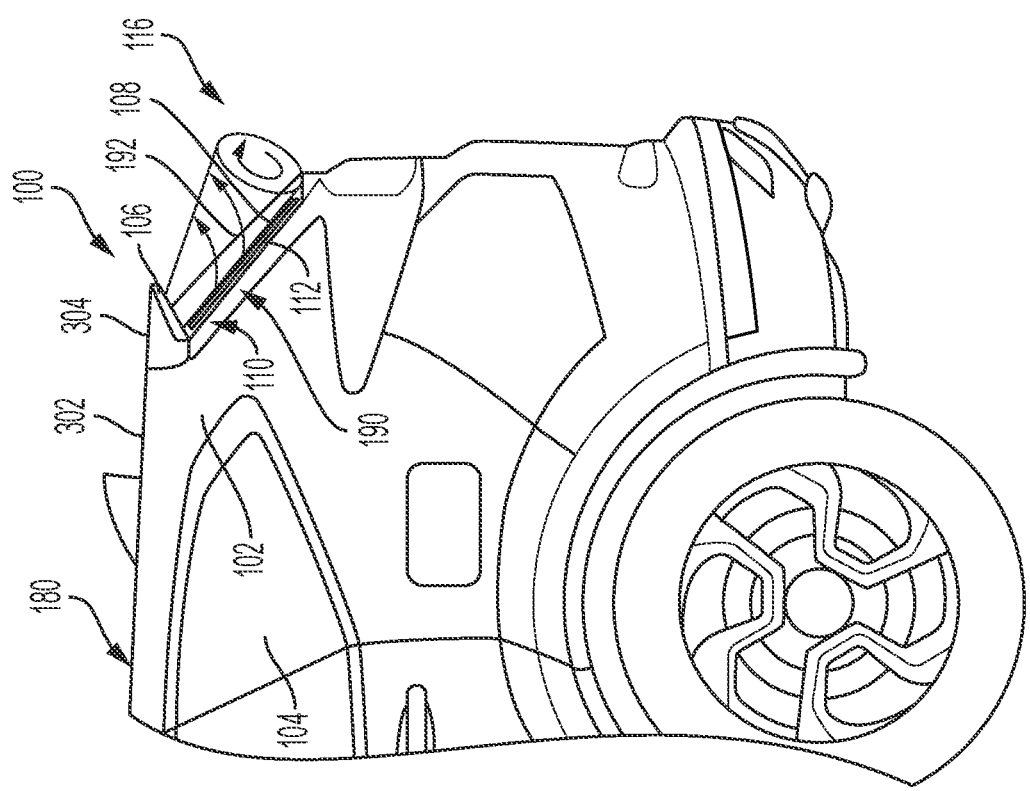
FIG. 3 is a side view of an example embodiment of a rear fence in a retracted position in accordance with aspects of the present disclosure.

Referring now to FIG. 3, a side view of vehicle 100 with rear fences 190 in the stowed or retracted position is shown. As shown in this embodiment, in some embodiments, the roof 180 of vehicle 100 can have an upper surface 302 that is continuous with an upper surface 304 of rear upper spoiler 106 so as to form an uninterrupted uniform surface on the top of vehicle 100. When rear fences 190 are in the stowed or retracted position on the underside of rear upper spoiler 106, peripheral regions 110 where rear upper spoiler 106 intersects or meets with the rear panel 192 and trailing edge 112 of rear pillar 102 running along the perimeter of rear window 108 create end vortices 116 of air that cause higher aerodynamic drag for vehicle 100 and reduce the overall effectiveness and/or aerodynamic performance of rear upper spoiler 106.

Figure 4:
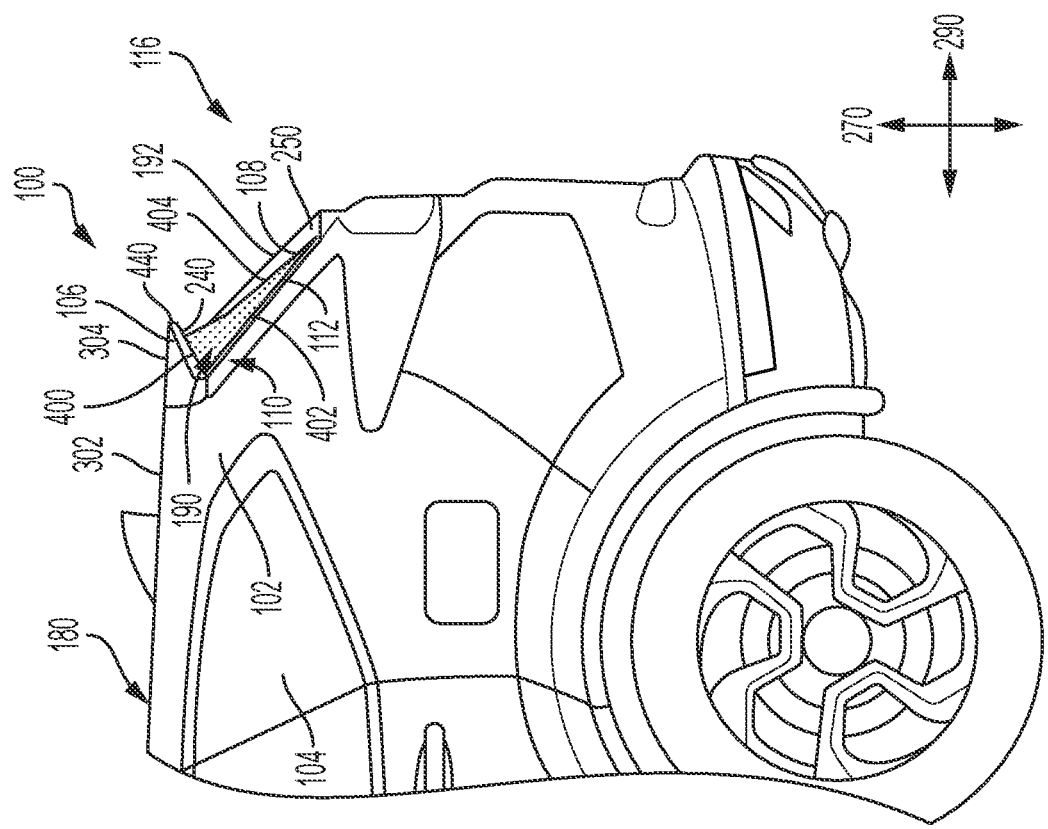
FIG. 4 is a side view of an example embodiment of a rear fence in a deployed position in accordance with aspects of the present disclosure.

Referring now to FIG. 4, a side view of vehicle 100 with rear fences 190 in a deployed position is shown. In example embodiments, rear fences 190 are located within the peripheral regions 110 on either side of the rear of vehicle 100 between the rear upper spoiler 106 and lower panel edge 250 of rear panel 192, where lower panel edge 250 in this case runs along the lower perimeter of rear window 108. In this embodiment, a substantially planar or flat body of the rear fence 190 includes a top edge 400 that is configured to contact or be disposed adjacent to the underside of rear upper spoiler 106. Rear fence 190 also includes a bottom edge 402 that is configured to contact or be disposed adjacent to the side portion of the rear panel 192. In one embodiment, the bottom edge 402 is joined to a hinge mechanism (see FIGS. 7 and 8) disposed directly behind the rear panel 192 or directly atop the rear panel 192. In another embodiment, the bottom edge 402 is fixedly attached or adhered to the surface of the rear panel 192. Rear fence 190 also includes an outer edge 404 that extends from the rearmost edge 240 of rear upper spoiler 106 towards lower panel edge 250. The outer edge 404 is the edge of the rear fence that is not adjacent to or in contact with another component of the vehicle when the spoiler is deployed. In some embodiments, outer edge 404 thereby can comprise multiple edges, depending on the shape of the rear fence. With this configuration, top edge 400, bottom edge 402, and outer edge 404 of the body of rear fence 190 form a substantially triangular shape. However, it should be understood that the outer edge 404 need not be linear, and can include curvature and/or multiple sides, as shown in FIGS. 4, 9A-9C, and 10A-10G. In addition, the proposed embodiments can be implemented even on vehicle surface with substantial curvature along the rear panel. For example, vehicles that include a substantially curved rear windshield can readily include such rear fences. In some cases, the rear fences themselves may be curved to accommodate various desired airflow patterns.

In some embodiments, edges of rear fence 190 may be arranged so as to be flush with the other vehicle body components, including a tip of top edge 400 being nearly flush with a portion of the rearmost edge 240 of the underside of rear upper spoiler 106 and bottom edge 402 being substantially flush along its respective side portion of rear panel 192. In other embodiments, small gaps or spaces may be provided between the edges of rear fence 190 and the vehicle body components, for example, on the order of several millimeters (e.g., 2-5 mm) to allow for manufacturing tolerances and other margins.

As shown in FIG. 4, outer edge 404 of rear fence 190 is approximately aligned with the rearmost edge 240 of the curved end portion of rear upper spoiler 106. That is, the dimensions of rear fence 190 are configured so as to extend from the surface of the rear panel 192 along at least a portion of the underside of rear upper spoiler 106. In some embodiments, the rear fence 190 is substantially parallel to trailing edge 112 of rear pillar 102. In one embodiment, top edge 400 may have a length at least half as long as the length of the portion of rear upper spoiler 106 that extends over rear window 108 (e.g., approximately 300 mm). However, in other embodiments, the dimensions of rear fence 190 may vary. For example, in some cases, top edge 400 of rear fence 190 may extend up to or past a lower end 440 of the rear upper spoiler 106 so that top edge 400 of rear fence 190 protrudes outward and has a length that is greater than the length shown in FIG. 4. It should be understood that the dimensions of rear fence 190 may scale with the size and dimensions of rear upper spoiler 106.

In some embodiments, the rear fences according to the example embodiments described herein are deployed while the vehicle is, for example, moving at a predetermined speed to improve aerodynamic performance. Referring now to FIGS. 5 and 6, two rear views of vehicle 100 including an embodiment of an active spoiler system are shown. FIG. 5A illustrates rear fences 190 in a retracted or stowed position beneath or under the rear upper spoiler 106. For example, rear fences 190 may be in the retracted or stowed positions when vehicle 100 is parked or when moving at speeds less than the predetermined speed at which rear fences are to be deployed.

In this embodiment, each individual rear fence, including first fence 202 on first side 182 of vehicle 100 and second fence 204 on the opposite second side 184 of vehicle 100, are folded approximately flat against the first side portion 172 and second side portion 174 respectively in their retracted or stowed positions. That is, in the retracted or stowed position, first rear fence 202 and second rear fence 204 are arranged underneath rear upper spoiler 106 such that the inner surfaces (e.g., inner surfaces 610 and 620, shown in FIG. 6) of each individual rear fence face the surface of the rear window 108, while the outer surfaces 510 and 520 face rearward (i.e., in a direction toward the viewer in FIG. 5). In other words, the planar body of the rear fences are oriented in a lateral direction when retracted.

In some embodiments, rear panel 192 may include corresponding recesses on either side that are configured to receive each rear fence 106 in the retracted or stowed position. In an example embodiment, each recess has a shape and size that corresponds and/or conforms to the shape and size of the respective rear fence. With this arrangement, rear fences 190, including first rear fence 202 and second rear fence 204, may be hidden or minimally visible when in the retracted or stowed position so as to provide aesthetically pleasing styling under parked and low speed conditions. For example, the recess may have a depth that is substantially similar to a thickness of the rear fence so that rear fence may fit snugly within the recess and provide a substantially smooth outer surface to the rear panel. However, in other embodiments, the rear panel 192 may not include recesses. For example, as shown in the figures, the rear panel can be substantially smooth and continuous, where each rear fence is disposed against and above the external surface (i.e., providing a layer that rest above the rear panel surface).

Next, FIG. 6 illustrates rear fences 190, including first rear fence 202 and second rear fence 204, in their deployed positions on either side of vehicle 100. In this embodiment, each of first rear fence 202 and second rear fence 204 has been rotated or pivoted outward (away from the rear panel 192) by a deployment mechanism (described below) that transitions each rear fence from the stowed position to an upright position so that outer edge 404 of each rear fence is substantially continuous or uninterrupted with an adjacent rearmost edge 240 of rear upper spoiler 106 on each side. In other words, the planar body of the rear fence is now oriented in a longitudinal direction. With this arrangement, rear fences 190, including first rear fence 202 and second rear fence 204, provide improved aerodynamic performance to vehicle 100 in their deployed positions.

Referring now to FIGS. 7 and 8, one example of a deployment mechanism 700 configured to move or transition rear fences 190 between the retracted or stowed position and the deployed position is shown. In an example embodiment, each individual spoiler of rear fences 190 may be associated with a separate deployment mechanism 700 that is configured to rotate or pivot the spoiler between the retracted or stowed position and the deployed position. In other embodiments, both rear fences 190 on each side of vehicle 100 may be deployed and/or retracted using a single deployment mechanism. For example, a single deployment mechanism may be connected to both rear fences using linkages and other mechanisms to deploy and/or retract both rear fences in unison.

In different embodiments, deployment mechanism 700 is located behind or beneath a side portion of the rear panel and/or the rear pillar and arranged with a pivot or rotation axis 702 that is approximately aligned along the longitudinal direction of vehicle 100 (e.g., from the front end to the rear end of vehicle 100). In some embodiments, pivot or rotation axis 702 may also be angled in lateral direction, or in vertical direction, or be oriented diagonally relative to the three axes. In some embodiments, the deployment mechanism 700 is disposed within a compartment or other space formed in the interior of rear panel. In other embodiments, the deployment mechanism 700 may protrude externally outward from the rear panel.

In an example embodiment, deployment mechanism 700 includes a motor 704 configured to rotate or turn a linkage 706 that is connected or attached to rear fences 190 by one or more support members 710. In different embodiments, the system can also include actuation components, such as but not limited to electromagnetic and/or pneumatic actuators. By action of motor 704 rotating or turning linkage 706, rear fences 190 may be rotated or pivoted between the retracted or stowed position and the deployed position. In this embodiment, support members 708 include a plurality of members connected or attached to the inner surface 610 of rear fences 190 (i.e., on the back side of rear fences 190 opposite outer surface 510, so that support members are not visible when the fences are stowed). Support members 710, in this case including three members, are approximately perpendicular to linkage 706 so as to translate the rotational movement of linkage 706 from motor 704 to the pivoting or rotating motion that transitions rear fences 190 between the retracted or stowed position and the deployed position. Additionally, in some embodiments, support member 710 can be connected to linkage 706 at one end so that they can rotate or turn along with linkage 706 when driven by motor 704.

In some embodiments, the apparatus described herein may include provisions for remaining in the retracted position until deployment is triggered. For example, in FIG. 7, the rear fence includes a magnetic component 750 embedded or attached to the surface of the rear fence that is configured to help secure the inner surface of the rear fence against the rear panel. The attractive force is strong enough to hold the rear fence against the rear panel during normal operation, and weak enough to freely permit the transition of the rear fence from the retracted position to the deployed position.

In other embodiments, support members 710 may include a larger or smaller number of support members. For example, in some cases, more support members may be used based on the type of material used to form the panel of rear fences 190. In addition, in cases where the material used to form the panel of rear fences 190 is a flexible material (including, for example, fabric), support members 608 may include a frame or other structure that defines a perimeter of the rear fence 190 to provide its triangular shape. In another embodiment, there may be no support members, or they may vary in size and placement and orientation along the rear fence surface.

In FIG. 7, the deployment mechanism 700 for rotating or pivoting rear fences 190 is shown with a representative rear fence 190 in a retracted or stowed position. In this embodiment, rear fence 190 is shown in the retracted or stowed position such that inner surface 610 is facing downwards (e.g., towards rear panel, as shown in previous figures). In this embodiment, motor 704 of deployment mechanism 700 rotates or turns linkage in a clockwise direction 700 to cause rear fence to pivot or rotate from the retracted or stowed position to the deployed position. Similarly, reverse motion by motor 704 drives linkage 706 in a counter-clockwise direction to cause rear fence to pivot or rotate back from the deployed position to the retracted or stowed position.

Referring now to FIG. 8, the deployment mechanism 700 for rotating or pivoting rear fences 190 is shown with a representative rear fence 190 in a deployed position. In this embodiment, motor 704 of deployment mechanism 700 has rotated or turned linkage in a clockwise direction to cause rear fence to pivot or rotate from the retracted or stowed position to the deployed position shown in FIG. 8. In this embodiment, outer surface 510 of rear fence 190 is facing away from a central axis of the vehicle, as shown in the previous figures. In one embodiment, motor 704 rotates or turns linkage 706 to pivot or rotate rear fence 190 approximately 90 degrees from the retracted or stowed position to the deployed position. In some cases, rear fence 190 may be rotated or pivoted more or less than 90 degrees (e.g., in a range between 80-110 degrees) in order to reach and fill peripheral regions between rear upper spoiler 106 and rear panel. For example, the amount of rotation may depend on the shape and slope of the vehicle body components, including but not limited to the rear panel (including the rear window), rear pillars, and/or rear upper spoiler configurations on any given vehicle.

Although an active deployment mechanism is described above, in different embodiments, the system can alternatively employ a semi-passive mechanism in which airspeed state can cause the rear fences to "flip" open and transition from the retracted position to the deployed position. In other words, the shape and orientation of the rear fence can be configured to push the rear fence up when windspeed exceeds a particular threshold value. Furthermore, in some embodiments, a spring retracted system may be used to move the fence between a deployed and stowed configuration. Similarly, in some embodiments, one or more electro magnets may be used to change the orientation of a fence.

Figure 9A:
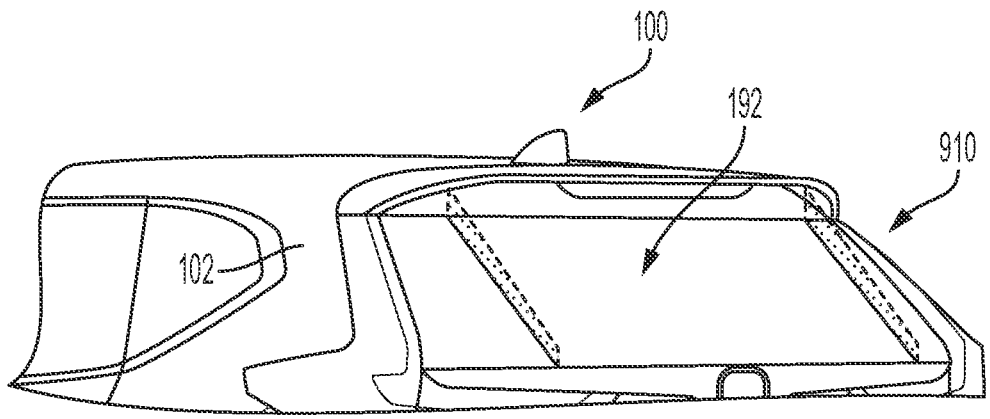
FIGS. 9A, 9B, and 9C are three embodiments of a set of rear fences in accordance with aspects of the present disclosure.
Figure 9B:
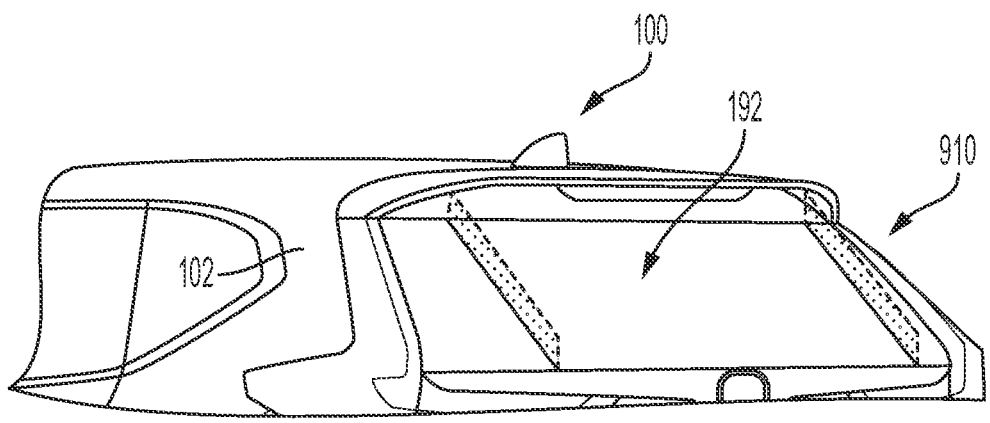
Figure 9C:
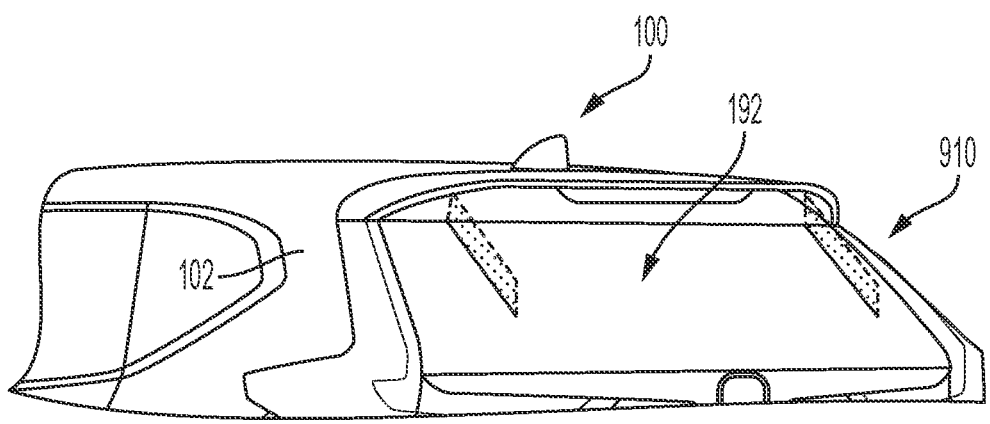

For purposes of clarity, FIGS. 9A-10H provide some non-limiting examples of variations of rear fences that may be implemented in the above-described system. In FIG. 9A, vehicle 100 includes a first fence type 910 comprising a substantially trapezoid shape, extending across most of the length of the rear panel 192 from top to bottom. Thus, a first end 930 is disposed directly adjacent or just touching the upper end of the rear panel, while a second end 932 is disposed directly adjacent or just touching the lower end of the rear panel. In FIG. 9B, a second fence type 920 also extends across most of the length of the rear panel 192 from top to bottom, but in this case has a substantially rectangular shape. In addition, it can be understood that any of the rear fences may have different lengths, as shown in FIG. 9C, where a third fence type 930 extends only partway (in this case, approximately halfway) down the rear panel 192. Thus, in contrast to FIG. 9A, a first end 940 is disposed directly adjacent or just touching the upper end of the rear panel, while a second end 942 is disposed in an interior portion of the rear panel, spaced apart from the lower end of the rear panel. In order to provide the desired aerodynamic benefits described here, it may be appreciated that the length of the fence should extend at least a third of the maximum distance (i.e., height) from the upper end of the rear panel to the lower end of the rear panel. Several more non-limiting examples of varying fence shapes that may be implemented are shown in FIGS. 10A-10G, including regular and irregular shapes. As a general matter the width of the fence decreases as it approaches the lowermost terminus (as shown in the examples of FIGS. 10A-10G), forming a narrowed or tapered end portion, though in other cases the width can remain substantially constant, depending on the aerodynamic flow desired.

Figure 11A:
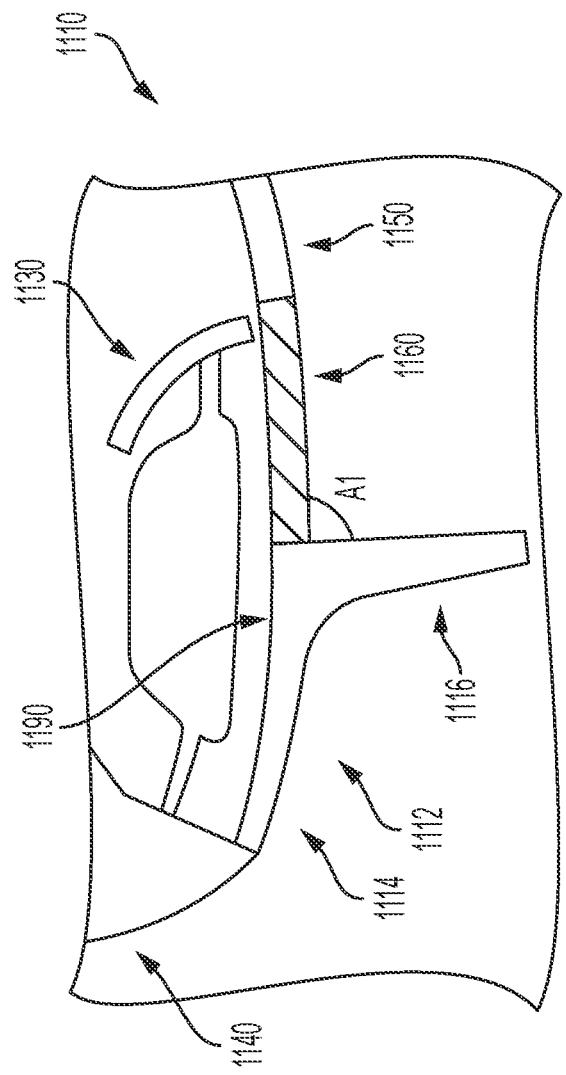
FIG. 11A depicts a static configuration of an embodiment of the rear fence in accordance with aspects of the present disclosure and FIG. 11B depicts an active configuration of an embodiment of the rear fence in accordance with aspects of the present disclosure.
Figure 11B:
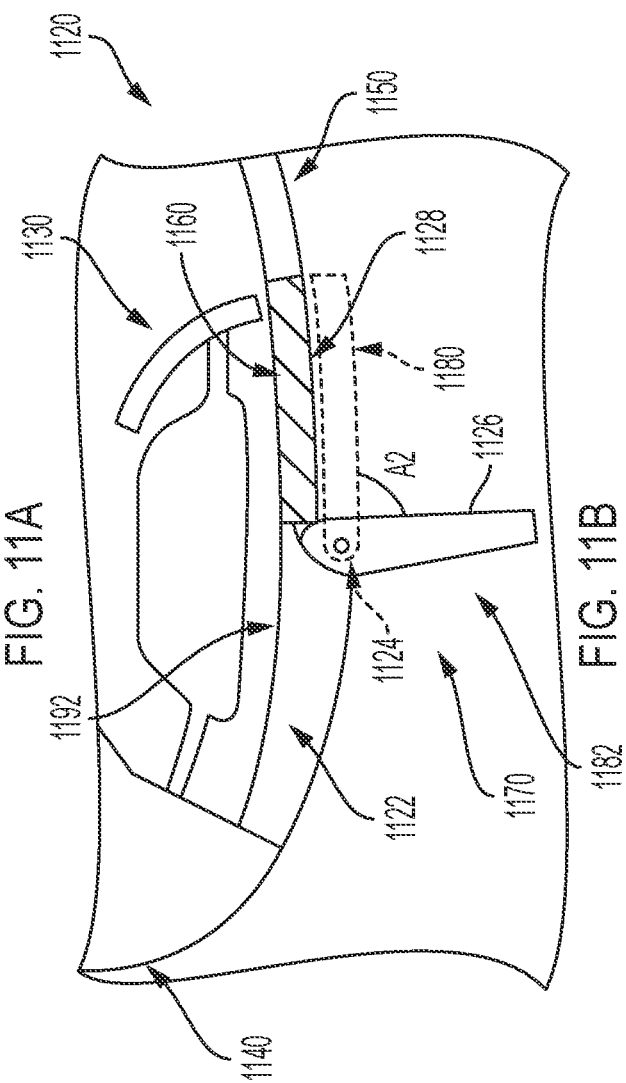

Referring now to FIGS. 11A and 11B, additional details regarding embodiments of static configuration 1110 and active configuration 1120 are presented by reference to top-down cutaway views of a side portion of the rear panel for each embodiment. As shown in both FIGS. 11A and 11B, an end portion of the rear upper spoiler 1140 is disposed further outboard (distal) relative to a first side portion 1190 in FIG. 11A and a second side portion 1192 in FIG. 11B. In this case, the side portions include the fence and adjoining rear panel surface such as a panel 1160 and/or a glass portion 1150. In addition, as noted above, the fences are positioned along the side portions (e.g., first side portion 1190) of the rear panel of the vehicle. Thus, in FIG. 11A, a static rear fence 1112 is disposed inboard (closer toward a midline of the rear panel) of the end portion of the rear upper spoiler 1140. Similarly, in FIG. 11B, an active rear fence 1170 is disposed inboard (closer toward a midline of the rear panel) of the end portion of the rear upper spoiler 1140.

More specifically, in the static configuration illustrated in FIG. 11A, a first anchor portion 1114 of the static rear fence 1112 is disposed directly inboard of the end portion of rear upper spoiler 1140, and outboard of panel 1160 and glass 1150. Similarly, in the active configuration of FIG. 11B, a second anchor portion 1122 is disposed directly inboard of the end portion of rear upper spoiler 1140, and outboard of the panel 1160 and glass 1150. In different embodiments, the first anchor portion 1114 and the second anchor portion 1122 are embedded or integrally formed within their respective side portions. Thus, in FIGS. 11A and 11B, first anchor portion 1114 is integrally formed in first side portion 1190 and second anchor portion 1122 is integrally formed in second side portion 1192. In other embodiments, an anchor portion may be disposed atop or against of a surface of the side portion. In addition, it may be observed the first side portion 1190 in FIG. 11A and the second side portion 1192 in FIG. 11B are each disposed rearward of a rearmost pillar 1130 of the vehicle. In some embodiments, the side portion can correspond to a rearmost surface of the rearmost pillar 1130 or is disposed directly adjacent to a rearmost surface of the rearmost pillar 1130.

Furthermore, as shown in FIG. 11A, the first anchor portion 1114 and a protruding first blade portion 1116 are integrally formed as one piece in the static configuration 1110. An angle A1 can vary in different embodiments, but in this case may be understood to be approximately 90 degrees. In contrast, in the active configuration 1120 of FIG. 11B, the active rear fence 1170 includes a hinge portion 1124 that connects second anchor portion 1122 to a second blade portion 1126. The hinge portion 1124, when the fence is activated, permits rotation of the second blade portion 1126 from a first position 1180 (shown in dotted line) to a second position 1182, in this case corresponding to a rotation around an angle A2. In different embodiments, the maximum value of angle A2 can vary, though in this case it is shown as being around 90 degrees. In addition, in some embodiments, the second blade portion 1126 may be configured to rotate and maintain a position anywhere between first position 1128 and second position 1182.

Figure 12A:
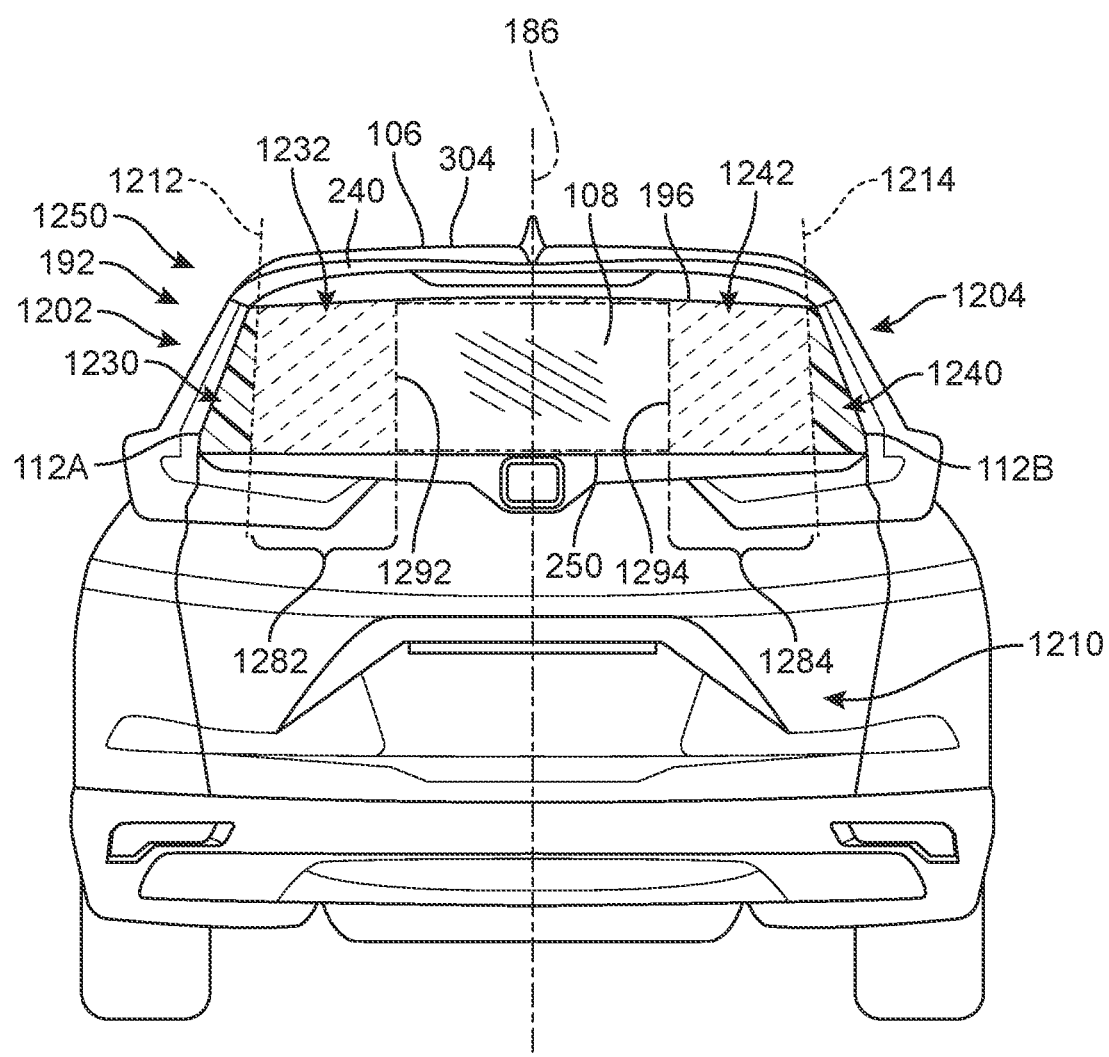
FIGS. 12A and 12B depict a rearward-facing surface of a vehicle in accordance with aspects of the present disclosure.
Figure 12B:
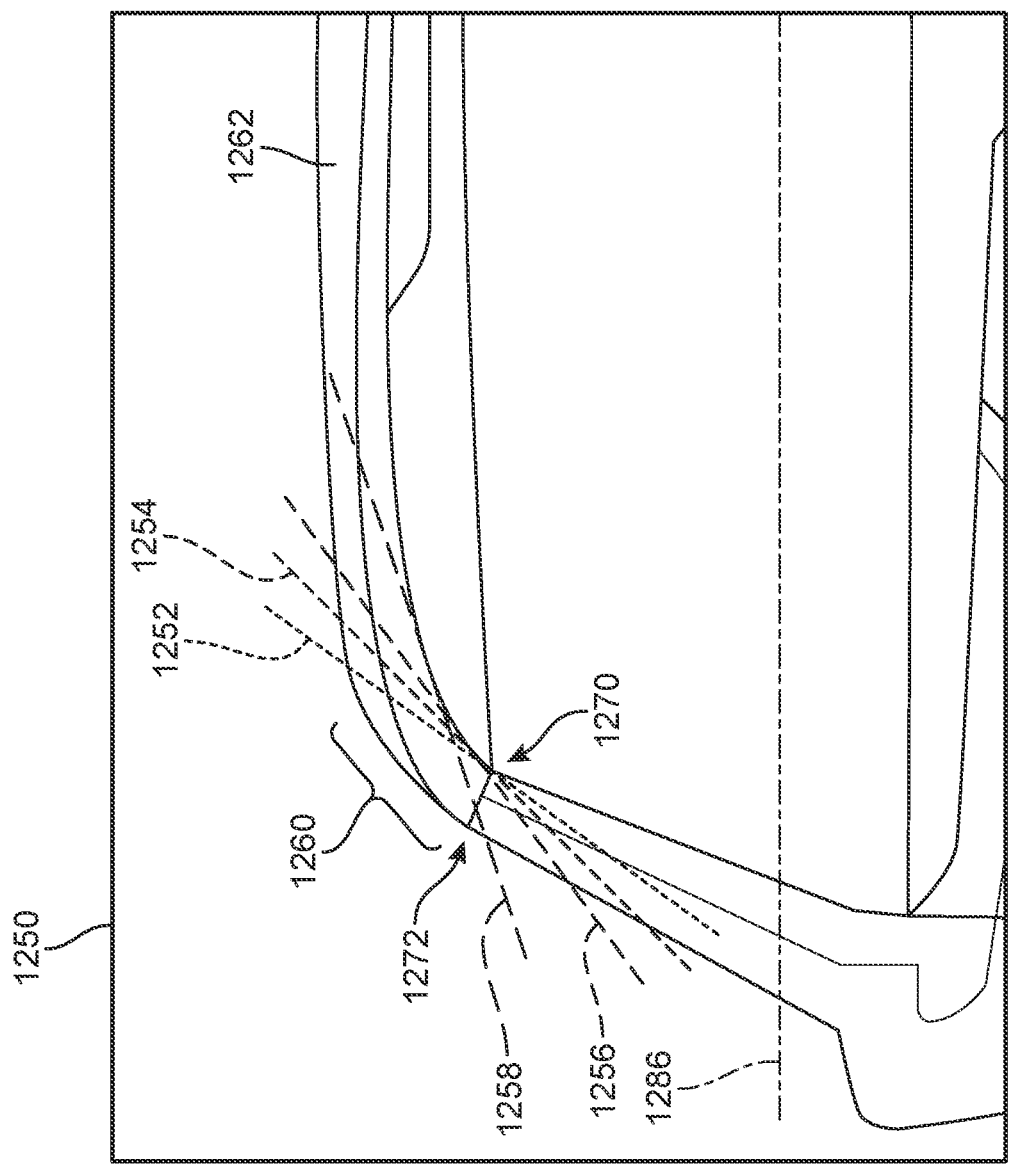

Additional views illustrating some of the proposed systems are provided with reference to FIGS. 12A-16. It should be understood that one or more features discussed with reference to FIGS. 1-11 may be implemented by the devices depicted in FIGS. 12A-16; similarly, one or more features discussed with reference to FIGS. 12A-16 may be implemented by the devices depicted in FIGS. 1-11. In FIG. 12, a rear view of vehicle 100 is shown in which several referential lines generally demarcating regions have been added for purposes of clarity to the reader. The rear fences have been removed from FIGS. 12A and 12B to allow the reader to more clearly distinguish each region.

As noted earlier, the rear panel 192 extends between first trailing edge 112a and second trailing edge 112b in a direction generally aligned with the width of the vehicle 100. In FIG. 12A this distance is shown as a distance D1. The rear panel 192 further extends from an upper panel edge 196 to lower panel edge 250 in a direction generally aligned with the vertical height of the vehicle 100. In FIG. 12A this distance is shown as a distance D2. In addition, in this example, the vehicle includes a lower tailgate portion 1210 to which the rear panel 192 is directly above and adjacent. In other words, the rear panel refers to a rear-facing surface of the vehicle that extends between the first rearmost pillar and the second rearmost pillar of the vehicle (i.e., laterally), regardless of the make or model. In other words, the rear panel 192 extends from a region just inboard or proximal (i.e., toward the central axis 186) of a first rearmost pillar 1202 and a region just inboard or proximal (i.e., toward the central axis 186) of a second rearmost pillar 1204, while the height of the rear panel 192 can vary based on the make or model of the vehicle (e.g., whether the vehicle is an SUV, van, station wagon, sedan, etc.). Thus, the rear panel 192 may present as shown here, may include or not include a rear glass, may comprise two pieces when formed in a set of rear double doors, may be disposed above or below the tailgate or be mounted within the tailgate, may comprise the region extending laterally that includes both the right and left taillights, may be disposed directly above a pop-up or down trunk hatch or boot, may be part of a door that opens left or right to expose the rear interior of the vehicle, may comprise a substantially smooth or continuous piece (e.g., with no rear glass), and/or or may include different sections, such as but not limited to a rear glass disposed within a larger frame.

In different embodiments, vehicles implementing the proposed devices include upper spoiler 106. In embodiments in which the proposed devices are implemented without a rear upper spoiler, the reference to an upper spoiler that occur below may be understood to refer to the rearmost edge of the roof of the vehicle. In cases in which the rear of a vehicle is not symmetrical (e.g., Nissan Cube®) and/or includes only one curved end portion for the upper spoiler or roof edge, the positioning of the second fence may be understood to be selected to ensure both fences are equidistant from the central axis 186.

As shown in FIG. 12A, for purposes of clarity to the reader, the rear panel 192 can be understood to include a first boundary line 1212 and a second boundary line 1214. The location of each boundary line can be understood to be linked to the overall shape and curvature of upper spoiler 106 or rearmost roof edge. More specifically, as shown in magnified view in FIG. 12B of a corner region 1250 of the vehicle, the upper spoiler 106 (or rearmost roof edge) includes an elongated body portion 1262 extending between a first curved end portion or junction and a second curved end portion or junction. For example, a curved end portion 1260 of the rear upper spoiler is directly adjacent to the first pillar 1202, while another curved end portion is directly adjacent to the second pillar 1204. In some embodiments, the curved end portion of the upper spoiler or rearmost roof edge can extend directly from the rearmost pillar. As shown in isolated view of corner region 1250, an upper corner portion 1270 of the rear panel 192 is directly inboard of the first corner region 1250. As the curved end portion 1260 extends from a first end 1272 to the elongated body portion 1262, its curvature changes.

For purposes of reference, a first tangential line 1252, a second tangential line 1254, a third tangential line 1256, and a fourth tangential line 1258 have been included to better reflect the change in curvature. The angle of each tangential line can be viewed relative a horizontal line 1286 extending along the lateral width of the vehicle. The first tangential line 1252 touches the curved end portion 1260 at a first point, the second tangential line 1254 touches the curved end portion 1260 at a second point, the third tangential line 1256 touches the curved end portion 1260 at a third point, and the fourth tangential line 1258 touches the curved end portion 1260 at a fourth point where the first point is disposed most outboard, the fourth point is disposed most inboard, the second point is disposed between the first point and the third point, and the third point is disposed between the second point and the fourth point. As each point moves further inboard, the orientation of the corresponding tangential line becomes increasingly flat. In other words, the tangential lines show a transition from an orientation that is generally vertical or downward to an orientation that is generally horizontal, shown here as the second point (also referred to as a transition point) along the curved end portion 1260.

For purposes of this application, a boundary line (e.g., first boundary line 1212) corresponds to a substantially vertical boundary line that passes through the second point, which corresponds to the point at which a tangential line for the curved end portion becomes more horizontal than vertical (i.e., approximately 45 degrees or less relative to the horizontal line 1286). The boundary line can be slightly angled in cases where the trailing edge is also non-vertical to extend in an approximately parallel direction relative to the trailing edge (such as the example of FIG. 12A). In other embodiments, the boundary line is true-vertical, again depending on the orientation of the adjacent trailing edge for the rearmost pillar. Thus, the two boundary lines can be understood to extend in a primarily downward vertical orientation along the point at which exterior-facing upper surface 304 of the upper spoiler or rearmost roof edge is aligned with a more horizontal orientation than a vertical orientation. In the drawings, the boundary line is tilted to align with the outer slope of the rear panel and is therefore not true-vertical unless the rear panel is also vertically disposed. In this case, the first tangential line 1252 identifies a point that is outboard of the boundary line, while the third tangential line 1256 and fourth tangential line 1258 identify points inboard of the boundary line.

In all cases, the boundary line demarcates inboard regions (1232, 1242) from outboard regions (1230, 1240). In this example, the first boundary line 1212 is spaced apart from the first trailing edge 112a, demarcating a first outboard region 1230 from a first inboard region 1232. More specifically, the first outboard region 1230 extends in an outboard direction from the first boundary line 1212 to the first trailing edge 112a, and the first inboard region 1232 extends in an inboard direction from the first boundary line 1212 to the central axis 186. In a similar fashion, a second outboard region 1240 extends in an outboard direction from the second boundary line 1214 to the second trailing edge 112b, and a second inboard region 1242 extends in an inboard direction from the second boundary line 1214 to the central axis 186. Each outboard region is adjacent to a rear pillar. Together, the first inboard region 1232 and the second inboard region 1243 comprise a substantially continuous inboard section of rear panel 192, sandwiched or otherwise extending between the two outboard regions. While not all vehicles will include a smoothly continuous curved end portion along the two upper corner regions of the rear-facing surface, nor will all vehicles include an upper spoiler, the vehicle will include two intersections along its top rear edge at which the two edges (e.g., the roof edge/elongated portion and the trailing edge) come together. The point at which the corner portion has a more horizontally aligned edge may be understood to serve as the point through which the boundary line can extend vertically downward. In all cases, the proposed rear fences will be spaced apart from the trailing edges of the rear pillars in order to ensure stylistic and structural freedom, as discussed below. In embodiments for vehicles in which this intersection may be unclear or ambiguous, the boundary line can be understood to be spaced apart from the trailing edge of the nearest rearmost pillar by at least a third of an inch.

In some embodiments, the vehicle 100 includes rear window 108 that is disposed in a central region of the rear panel 192. For purposes of this application, the blade portions of each rear fence of the proposed embodiments will be positioned in or on a first side portion 1282 of the rear panel 192 that extends between the first boundary line 1212 and a first periphery 1292 of the rear window 108, and in or on a second side portion 1284 of the rear panel 192 that extends between the second boundary line 1214 and a second periphery 1294 of the rear window 108. In other words, the blade of each fence will protrude outward from a surface of the vehicle associated with either the first portion 1282 or the second portion 1284. Such an arrangement, in which each blade is spaced apart from the rearmost pillars and disposed inboard of the outer curved end portion of the upper spoiler or outboard region, allows for a significantly wider range of stylistic and aerodynamic designs for the shape and size of each blade. As one non-limiting example, the fence—being disposed inboard of and spaced apart from the trailing edge—need not be dependent on the appearance of the outboard body design of the vehicle, and can be designed independently, without detracting from the aesthetic of the design of the trailing edges and pillars. By positioning of each fence further inboard, the proposed embodiments offer significantly greater flexibility in styling, while also maintaining the aerodynamic improvements described earlier. For example, by providing a U-shaped compartment or cavity, bounded by the elongated body portion of the upper spoiler and the two blades, air flow is more effectively directed (see FIG. 2).

Figure 13A:
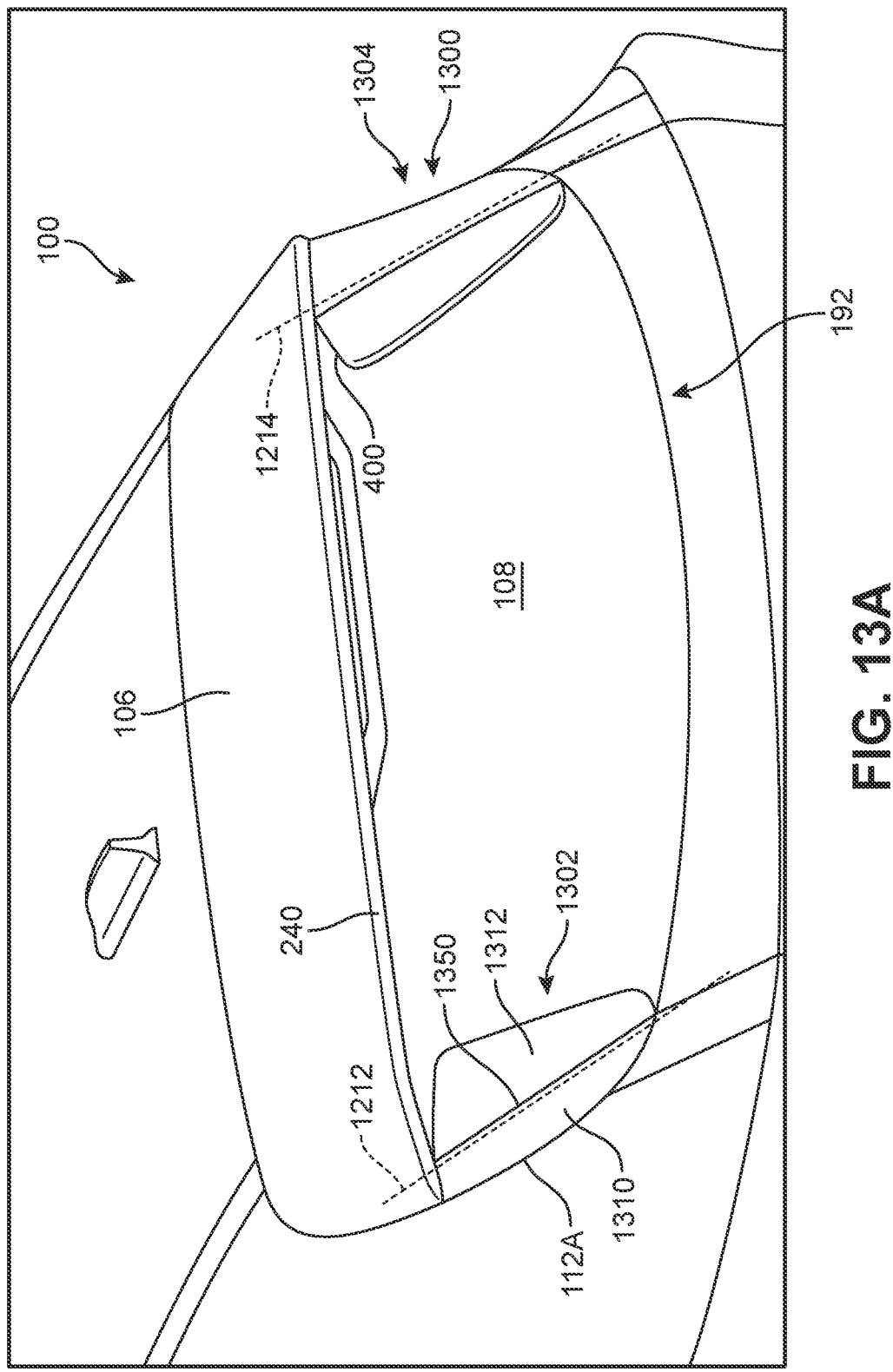
FIGS. 13A-16 illustrate some examples of rear fences in accordance with aspects of the present disclosure.
Figure 13B:
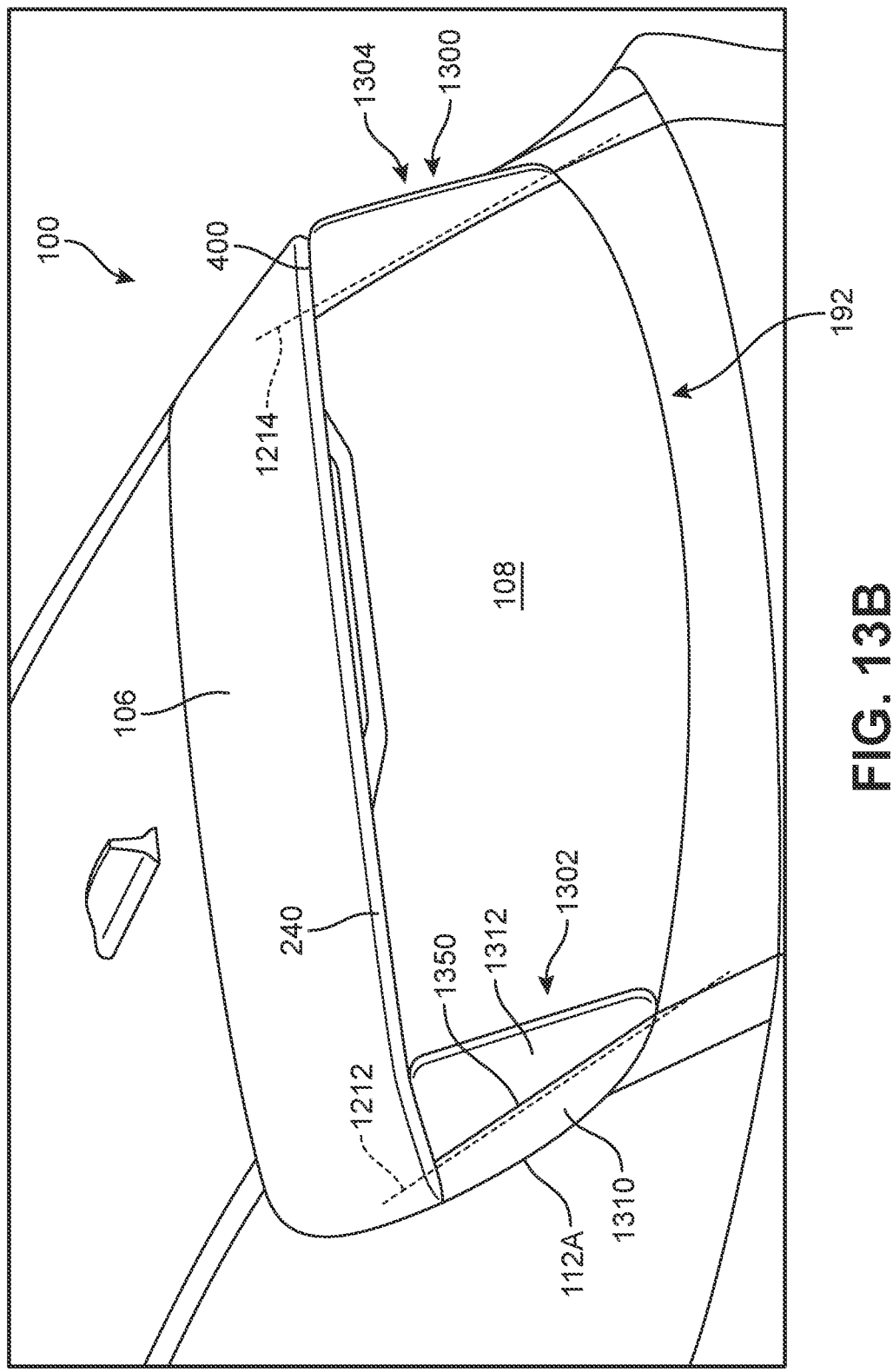

Some examples of this arrangement are illustrated in FIGS. 13A-16 below. In FIGS. 13A and 13B, an embodiment in which a set of dynamic fences 1300 are installed is depicted. In FIG. 13A, a first dynamic fence 1302 and a second dynamic fence 1304 are each in the stowed configuration. Each dynamic fence includes an optional garnish portion 1310 and a blade portion 1312, the two pieces being joined along a hinge portion associated with bottom edge 402. In different embodiments, the optional garnish portion 1310 can be implemented in any of the embodiments disclosed herein to offer additional design and stylistic flexibility and/or an alternative aesthetic, whereby the garnish corresponds to a material or panel that extends from the bottom edge of the blade in an outboard direction toward and/or up to the trailing edge. Thus, in one embodiment, a garnish can cover a portion of the rear panel that is associated with the outboard region. In FIG. 13B, the first dynamic fence 1302 and the second dynamic fence are each in the deployed configuration. It can be seen that some or all of hinge portion and bottom edge where the blade is in contact with or mounted on the rear panel 106 is located within the inboard region of the rear panel 192 (i.e., inboard relative to first boundary line 1212). In addition, in some embodiments, the top edge 400 of each rear fence 190 when deployed extends distally outward from the surface of the rear panel 192 to the lower rearmost edge 240 of upper spoiler 106.

Figure 14:
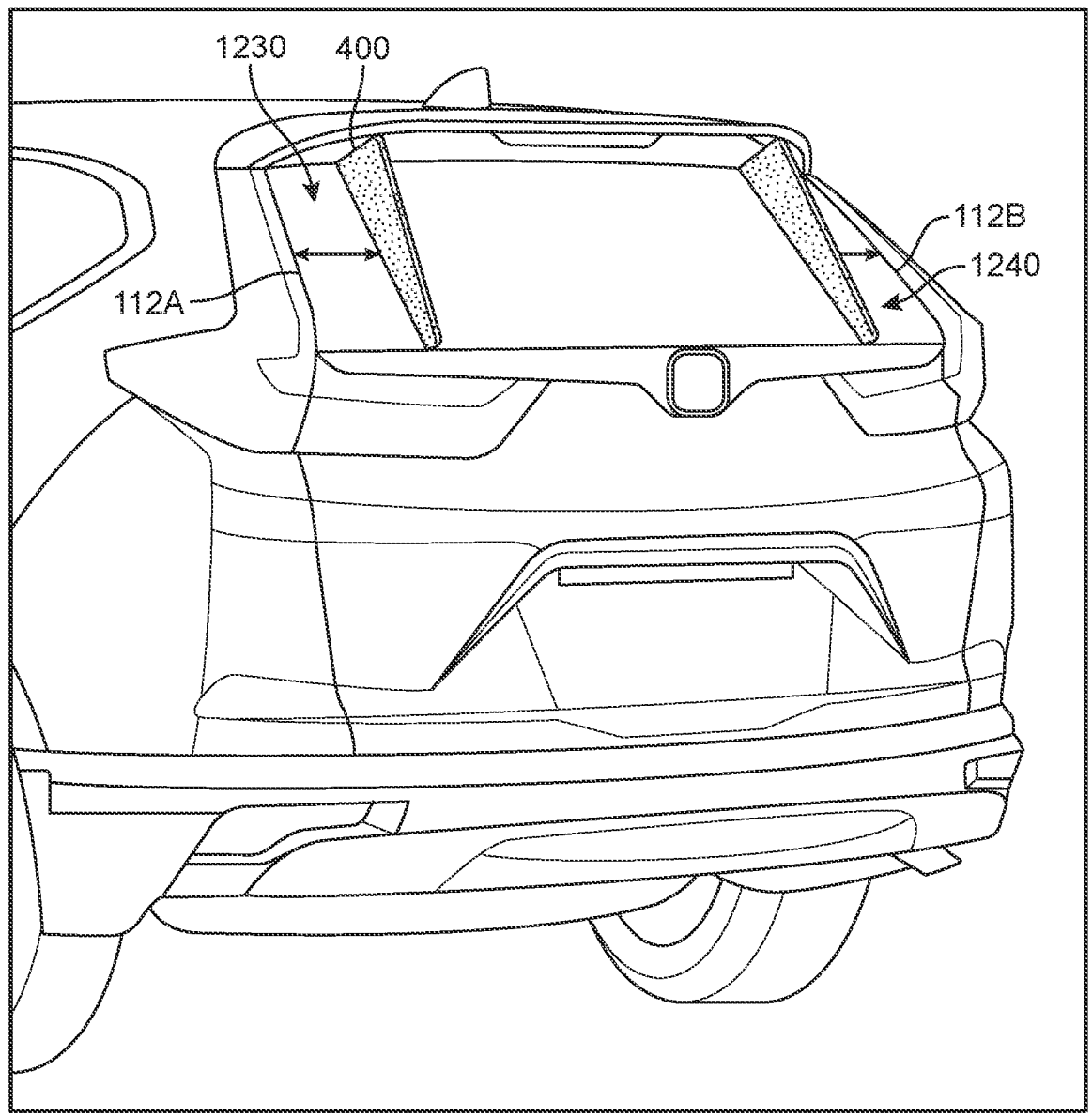
Figure 15:
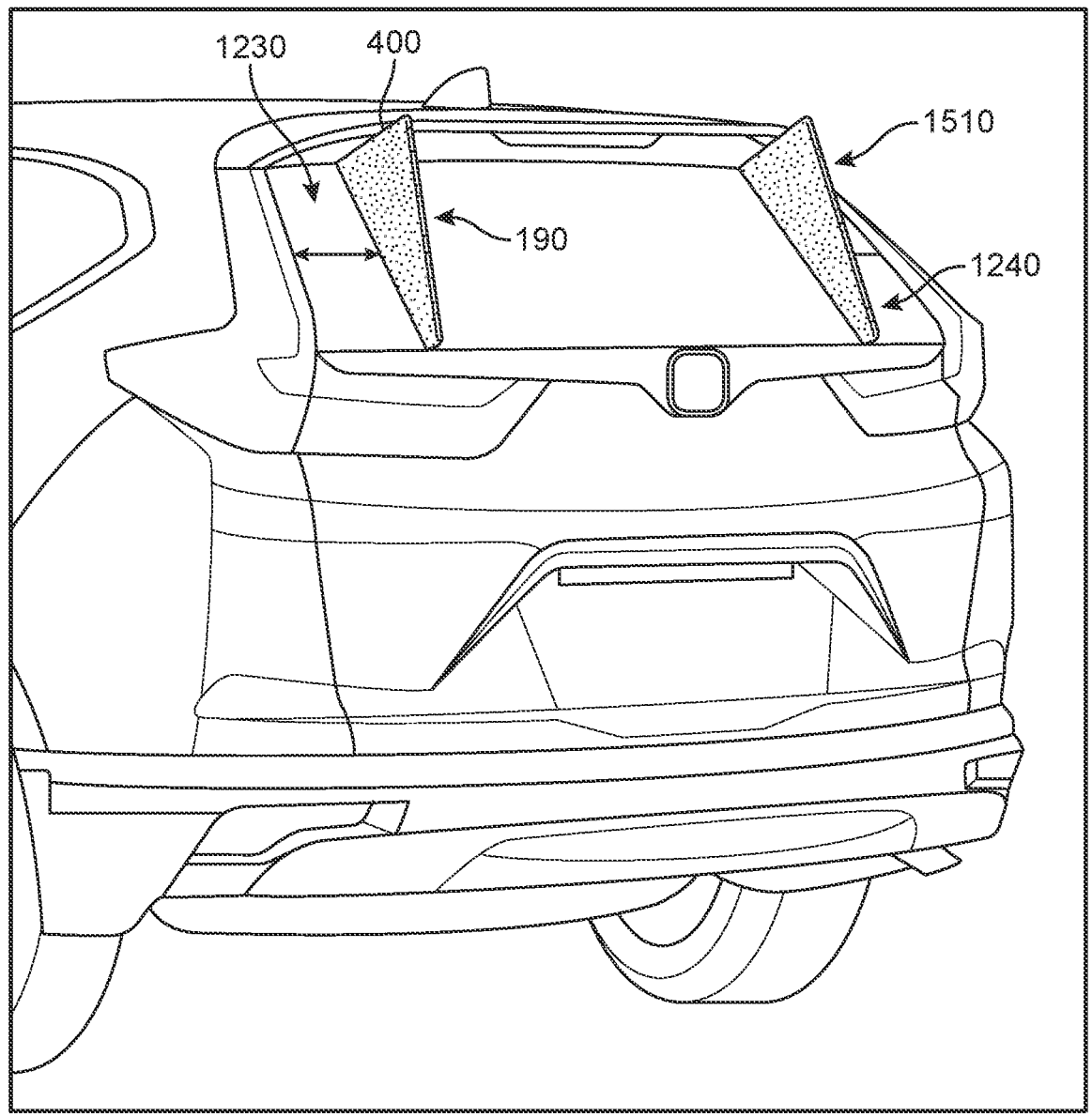
Figure 16:
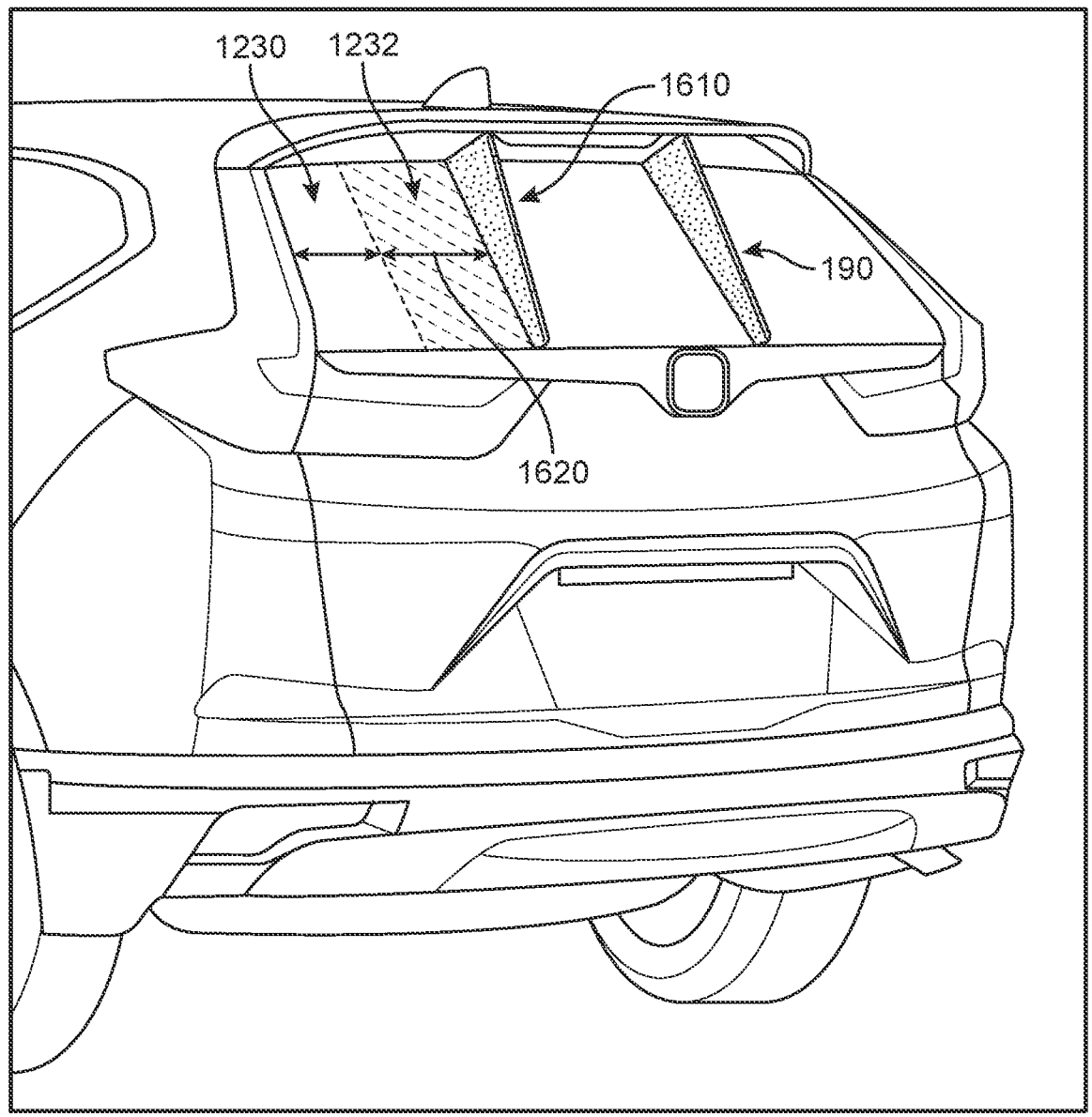

FIGS. 14-16 depict additional examples in which the rear fences are installed as static devices in the inboard regions of the rear panel. In FIG. 14, a first pair 1410 of rear fences 190 are shown. In this example, each rear fence is spaced apart from trailing edges 112 of the rear panel 192 by at least the distance of one of the two outboard regions 1230 and 1240. In other words, a bottom edge of a rear fence will be spaced apart in the inboard direction from the trailing edge by at least a distance D3, and in this case is even further spaced apart by a larger distance D4. As noted earlier, due to the flexibility in the position of the fences, their design can be modified without the need to accommodate the structural design of the rear pillars. In some embodiments, this can allow for the customization and/or personalization of the blades for different customer groups or types, including various outer edge shapes or curves.

In FIG. 15, the size of each fence in a second set 1510 of rear fences 190 has been enlarged, such that the top edge 400 now extends further distally outward. This modification has occurred without changing the design of the peripheral portions of the vehicle associated with the rear pillars. The position of the fences, as noted earlier, may also be moved further inboard as desired. In FIG. 16, a third set 1610 of rear fences 190 is shown in which the fences are spaced further inboard toward the center by a distance D5 that is larger than distance D4 of FIG. 14. In other words, each fence in this embodiment is now nearer to the central axis 186 relative to the fences shown in FIG. 14. The arrangement of the fences in FIG. 16 represents the approximate maximum distance from the trailing edges (i.e., just on the periphery of the rear window) that would continue to provide aerodynamic benefits as described herein.

In some embodiments, the rear fences of the present embodiments may be controlled between the retracted or stowed position and the deployed position using a deployment control system. For example, in different embodiments, the proposed systems and methods can use sensed information from vehicle sensors to detect the requisite increase in speed and/or merging onto a highway environment—also referred to herein as a triggering event—indicating the fences should be deployed. By automatically deploying the aerodynamic structures in response to a particular velocity, the system and method can help reduce the degree of air drag on the vehicle. Furthermore, it may be appreciated that in some embodiments, each rear fence can be configured such that it may deployed or otherwise controlled independently of the other rear fence. In other words, one rear fence may be deployed while the other remains retracted, or one rear fence may be only partly deployed while the other is fully deployed, etc. This type of control can be effective in vehicle conditions such as high side-winds, yaw air flow, and steering at high speeds, etc.

As one example, in some embodiments, the vehicle may include a speed monitoring and spoiler deployment system. The system may include multiple automotive components that may communicate via electronic control units. The components may include individual apparatuses, systems, subsystems, mechanisms and the like that may be included in the vehicle. In different embodiments, the vehicle may include sensors that may detect changes in the environment or detect events to determine whether the vehicle has exceeded a speed threshold for at least a first duration, and/or whether the vehicle has fallen below a speed threshold for at least a second duration. In another example, the vehicle can include sensors that detect when the vehicle is on a designated highway or other high-speed roadway, or an absence or presence of obstacles such as speed bumps. A number of different sensors may be used that include a wide variety of technologies, including but not limited to infrared sensors, ultrasonic sensors, microwave sensors, audio sensors, proximity sensors, accelerometers, odometer data, pressure sensors, light sensors, magnetometers, gyroscopes, passive acoustic sensors, laser detectors, GPS navigation sensors, or the like that may be used to detect the speed and/or environmental context of the vehicle.

As noted earlier, deployment and/or retraction can be initiated manually and/or automatically. In the case of a manual trigger, a user may select an option for a manual trigger via an interface provided via a user device connected to the vehicle or through a vehicle user interface. Thus, communications may optionally be established between a vehicle computing system and a user device. In the case of an automated initiation, the triggering event will correspond to one or more sensor data received via vehicle sensors indicating a condition matching a parameter for the deployment or retraction of one or both side skirts. In one embodiment the vehicle has an onboard diagnostic (OBD) system included in or connected to the vehicle computing system that is configured to continuously monitor various aspects of a vehicle such as the powertrain, emissions, chassis, and body of the vehicle, as well as other vehicle aspects. The OBD can be monitoring various automotive sensors built within the vehicle. In the automotive industry there is an industry wide standard for OBD computers, and what the OBD system monitors, known as OBD-II. These standard sensors provide data relating to various vehicle systems including the engine, transmission, chassis, and other vehicle systems. In one embodiment the activation sensor(s) are sensors already incorporated in the OBD. In another embodiment one or more of the sensors are separate from the OBD.

Those skilled in the art will appreciate that other triggers and sensors may be used in the system. Such sensor devices may be used to determine the vehicle's attitude, position, heading, velocity, location, acceleration, operation history, and the like. Sensor systems may also be used to sense objects around the vehicle, such as other vehicles, pedestrians, bicyclists, buildings, traffic signs, traffic lights, intersections, bridges, and the like. The system may be triggered by one of the vehicles safety systems being deployed such as the auto door lock being engaged or disengaged, or the parking of the vehicle. Those skilled in the art will appreciate that a multitude of other sensors and triggers could be used and the embodiments are not limited to the listed sensors.

Figure 17:
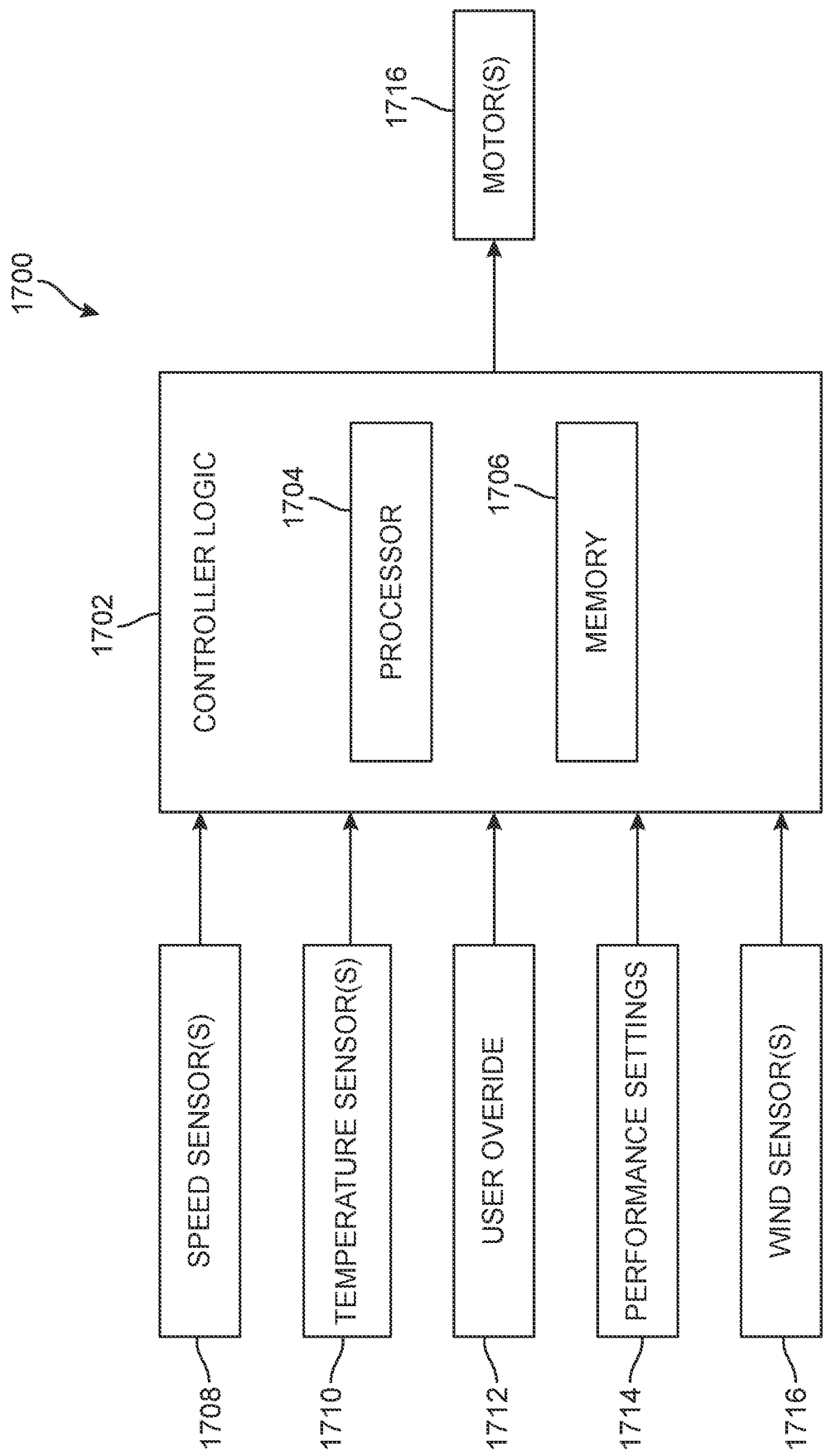
FIG. 17 is a block diagram of an example embodiment of a deployment control system including controller logic for controlling deployment of a rear fence in accordance with aspects of the present disclosure.

Referring now to FIG. 17, a block diagram of an example embodiment of a deployment control system 1700 is shown. In some embodiments, deployment control system 1700 may be installed or implemented in a vehicle (e.g., vehicle 100, described above) to control actuation of the rear fences (e.g., rear fences 190, described above) between the retracted or stowed position and the deployed position. For example, in an example embodiment, deployment control system 1700 may be part of, or in communication with, other systems in the vehicle, such as an engine control unit (ECU) or other control systems for the vehicle. In one embodiment, deployment control system 1700 includes at least a controller logic 1702 comprising at least one processor 1704 and a memory 1706 for storing instructions for implementing deployment and/or retraction of the rear fences.

In some embodiments, controller logic 1702 may receive one or more inputs from various sources within the vehicle (e.g., vehicle 100) that may be used to detect a deployment condition for sending an instruction to deploy the rear fences (e.g., rear fences 190), as well as detecting a retraction condition for sending an instruction to retract the rear fences. In an example embodiment, the inputs to controller logic 1702 may include, but are not limited to: one or more speed sensors 1708 configured to detect and/or determine a speed of the vehicle (e.g., wheel speed sensors, global positioning system (GPS) sensors, or other sensors typically included on a vehicle that detect or determine a travel speed of the vehicle), one or more temperature sensors 1710 configured to detect or measure an ambient temperature outside of the vehicle, a user override input 1712 configured to allow a user to manually control deployment and/or retraction of the rear fences, wind sensors 1716 configured to detect and/or determine a wind speed, and/or inputs from performance settings 1714 associated with the vehicle. For example, performance settings 1714 may include options for a sport or performance mode that prioritizes vehicle performance (such as speed or acceleration) or an economy mode that prioritizes fuel efficiency or energy/battery consumption. Controller logic 1702 may also receive inputs from other vehicle sensors, such as rain or precipitation sensor.

In an example embodiment, controller logic 1702 receives inputs from one or more of speed sensors 1708, temperature sensors 1710, user override 1712, wind sensors 1716, and/or performance settings 1714 and, based on the inputs, determines whether to send an instruction to one or more motors 1716 of a deployment mechanism (e.g., motor 704 of deployment mechanism 700, described above) to deploy or retract the rear fences. For example, controller logic 1702 may use the received inputs to determine whether a deployment condition or a retraction condition has been met based on predetermined criteria stored in memory 1706. In one embodiment, the deployment condition may be a predetermined speed of the vehicle. In another embodiment, the deployment condition may be a predetermined wind speed. In other embodiments, the deployment condition may be a combination of a predetermined speed and other inputs, such as temperature (from temperature sensor 1710) and/or performance mode (from performance settings 1714) and/or wind speed (from wind sensors 1716). In one embodiment, the retraction condition may be a predetermined speed of the vehicle, for example, the same predetermined speed as the deployment condition or a different predetermined speed that is lower than the predetermined speed used for the deployment condition. In other embodiments, the retraction condition may be a combination of the predetermined speed and other inputs such as temperature (from temperature sensor 1710) and/or performance mode (from performance settings 1714) and/or wind speed (from wind sensors 1716).

In some embodiments, a user (e.g., the driver of vehicle 100) may manually instruct controller logic 1702 to send an instruction to motor 1716 to deploy or retract the rear fences via user override 1712. That is, an input received from user override 1712 may be configured to satisfy a deployment condition or a retraction condition that causes controller logic 1702 to send the corresponding instruction to motor 1716 to deploy or retract the rear fences. With this arrangement, a user may have manual control over whether the rear fences are in the retracted or stowed position or the deployed condition.

Figure 18:
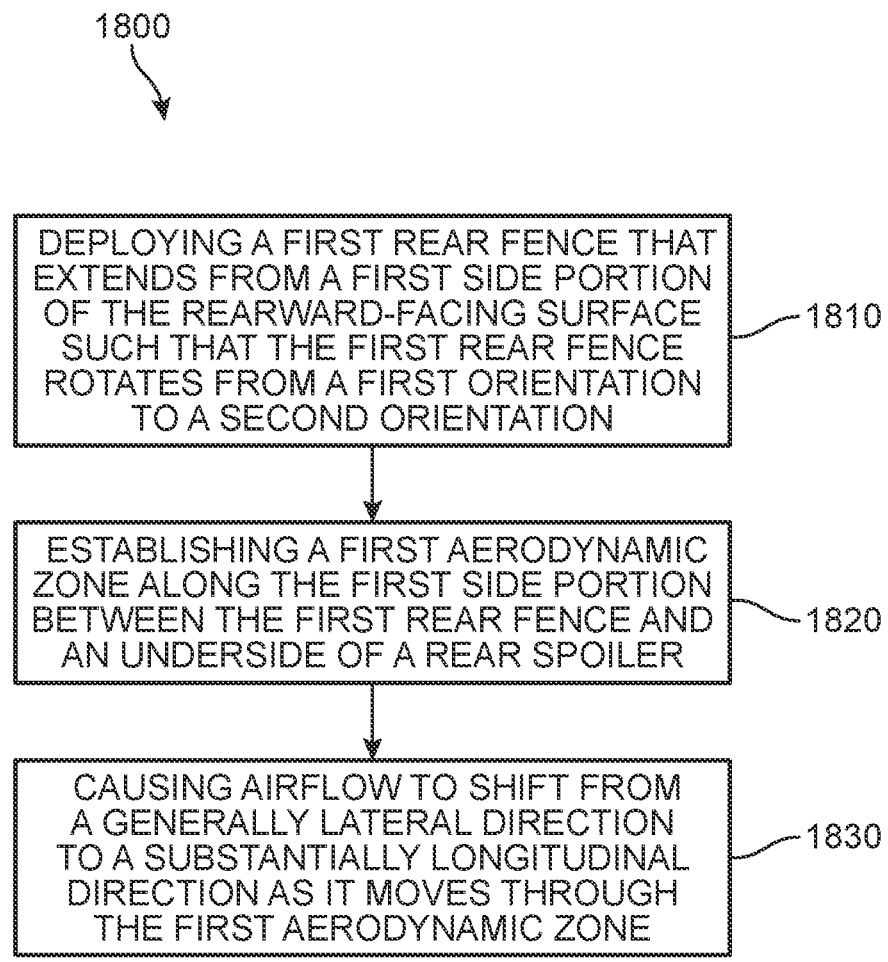
FIG. 18 is a flowchart of an example embodiment of a method for controlling deployment of a rear fence in accordance with aspects of the present disclosure.

Referring now to FIG. 18, a method 1800 of re-directing or permitting air flow along a rearward-facing surface (rear panel) of a vehicle is presented. The method 1800 includes a first step 1810 of deploying a first rear fence that extends from a first side portion of the rearward-facing surface such that the first rear fence rotates from a first orientation to a second orientation. A second step 1820 involves establishing a first aerodynamic zone along the first side portion between the first rear fence and an underside of a rear spoiler. A third step 1830 includes causing airflow to shift from a generally lateral direction to a substantially rearward and/or longitudinal direction as it moves through the first aerodynamic zone. This method thereby permits a detached flow of air outboard of the rear fence, allowing for a system and structure not constrained to aerodynamic continuity with the side panel beyond the rearmost pillar.

In other embodiments, the method may include additional steps or aspects. In some embodiments, the first aerodynamic zone extends to a central axis and merges with a second aerodynamic zone formed by the underside of the rear spoiler and a second rear fence disposed on a second side portion. In one example, the first rear fence is disposed below the underside of the rear spoiler. In another example, deployment occurs in response to a change in speed of the vehicle. In some embodiments, the method can also include a step of retracting the first rear fence, thereby causing airflow to shift back from the rearward longitudinal direction to the lateral direction. In some embodiments, the first rear fence is inboard of a rearmost pillar of the vehicle. In one embodiment, air pressure is greater inboard of the first rear fence than outboard of the first rear fence when the first rear fence is deployed.

As discussed above, deployment of rear fences in accordance with aspects of the present disclosure, for example per the method 1800 of FIG. 18, may be implemented by at least one processor in a vehicle, such as a processor 1704 of controller logic 1702, described above. In an example embodiment, the method 1800 may begin at an input stage. At input stage, one or more inputs from vehicle sensors are received at the processor. For example, in one embodiment one or more inputs from speed sensors 1708, temperature sensor 1710, user override 1712, wind sensor 176, and/or performance settings 1714 may be received at processor 1704 of controller logic 1702.

Following the input stage, the method 1800 can be implemented by a detection stage. At detection stage, a deployment condition is detected. As described above, in an example embodiment, the deployment condition may be detected based on a predetermined speed of the vehicle. For example, when the vehicle speed (e.g., received from speed sensors 1708) is equal to or greater than the predetermined speed, then the deployment condition may be detected during detection stage. In one embodiment, the predetermined speed for the deployment condition may be 45 miles per hour. In different embodiments, the predetermined speed for the deployment condition may be set at a higher or lower speed.

In other embodiments, the deployment condition detected during detection stage may include other inputs in combination with the predetermined speed. In one embodiment, an ambient temperature received from temperature sensor 1710 and/or a presence of rain or precipitation from a rain or precipitation sensors may be used in combination with the predetermined speed to determine the deployment condition. For example, the deployment condition may include a minimum ambient temperature in addition to the predetermined speed so that the rear fences are not deployed in conditions where ice or freezing rain may cause damage to the rear fences or the deployment mechanism. That is, deployment of the rear fences (i.e., via instruction sent to the motor) is prohibited when the ambient temperature is below the minimum ambient temperature.

In other embodiments, the deployment condition may be based on other inputs. For example, an input from user override 1712 to manually deploy the rear fences may be the deployment condition detected. In another embodiment, an input from performance settings 1714 may be used to adjust the predetermined speed at which the rear fences are deployed. For example, in a performance mode, the predetermined speed for deploying the rear fences may be lower than in other modes so that the best aerodynamic performance is achieved. Similarly, in an economy mode, the predetermined speed for deploying the rear fences may be chosen to provide better fuel economy than in other modes. Other factors for detecting a deployment condition may also be provided during the detection stage.

Next, once the deployment condition has been detected, the method can proceed to a deployment stage. During deployment stage the motor or motors are instructed to deploy the rear fences. For example, processor 1704 of controller logic 1702 may send an instruction to motor 1716 of the deployment mechanism (e.g., motor 704 of deployment mechanism 700) to pivot or rotate rear fences 190 from the retracted or stowed position to the deployed position.

In some embodiments, after deployment of the rear fences, the method may (optionally) further include additional operations configured to determine when to retract the rear fences. For example, in some embodiments, the method includes an operation where one or more vehicle sensors are monitored by the processor. In one embodiment, the monitored sensors may include any of the vehicle sensors previously described, including, but not limited to speed sensors 1708, temperature sensor 1710, user override 1712, and/or performance settings 1714. If a retraction condition is detected (e.g., based on a predetermined speed of the vehicle) the system can trigger a retraction action. For example, when the vehicle speed (e.g., received from speed sensors 1708) is less than a predetermined speed, then the retraction condition may be detected. In some cases, the predetermined speed for the retraction condition may be the same as the predetermined speed for the deployment condition. In other embodiments, the predetermined speed for the retraction condition may be different than the predetermined speed for the deployment condition. For example, in one embodiment, the predetermined speed for the retraction condition may be lower than the predetermined speed for the deployment condition. In one embodiment, for example, the predetermined speed for the deployment condition may be 45 miles per hour and the predetermined speed for the retraction condition may be 30 miles per hour. With this arrangement, by setting the predetermined speed for the retraction condition to be lower than the predetermined speed for the deployment condition, a situation where the rear fences are repeatedly deployed and retracted as the vehicle speed fluctuates may be avoided. In some embodiments, the retraction condition must be detected for at least a prespecified period of time (e.g., 30 seconds, one minute, several minutes, etc.) before retraction will occur.

In other embodiments, the detected retraction condition may include other inputs in combination with the predetermined speed. Additionally, as with the deployment condition, an input received from user override 1712 may manually trigger the retraction condition so that the user can control whether or not the rear fences are retracted or deployed.

In response to detection of the retraction condition, the motor or motors are instructed to retract or stow the rear fences. For example, processor 1704 of controller logic 1702 may send an instruction to motor 1716 of the deployment mechanism (e.g., motor 704 of deployment mechanism 700) to pivot or rotate rear fences 190 from the deployed position to the retracted or stowed position. That is, each rear fence 190 is pivoted or rotated from the deployed position (where the planar body is aligned with the longitudinal axis) back to the retracted or stowed position (where the planar body is aligned with the lateral axis) of vehicle 100.

Figure 19:
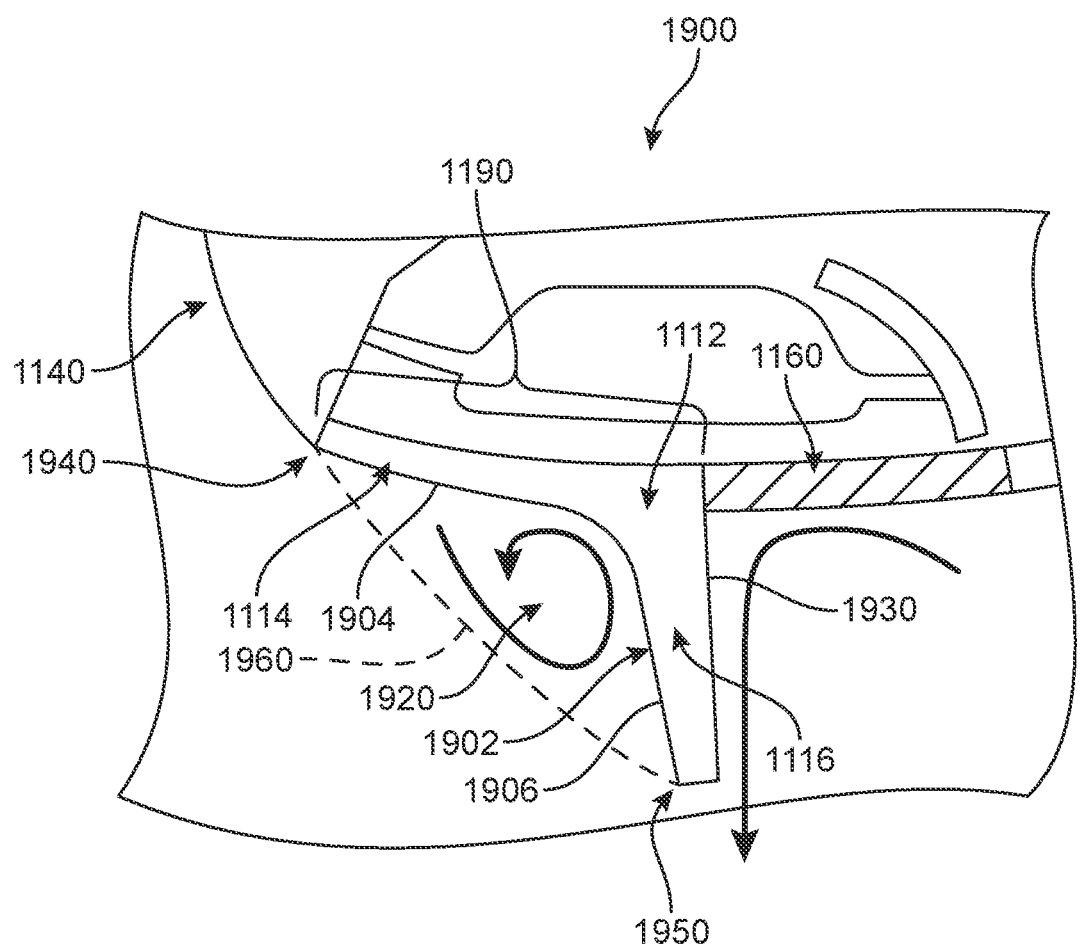
FIG. 19 depicts a detachment airflow zone of a vehicle formed by a rear fence, in accordance with aspects of the present disclosure.

Referring now to FIG. 19, an additional feature provided by the proposed embodiments is shown in cross-sectional view 1900. In FIG. 19, the first blade portion 1116 of static rear fence 1112 extends from first anchor portion 1114, in a manner similar to that described with reference to FIG. 11A. It can be observed that a substantially continuous exterior surface, extending from an outboard end 1940 of the static rear fence 1112 to an inboard end 1950 of the static rear fence 1112, forms a semi-enclosed or compartmented area. The inboard end 1950 refers to the rearmost portion of the blade portion, where the inboard side and outboard side of the blade portion meet. This area will be referred to herein as a detachment zone 1920, or interchangeably, as a damming zone, and should be understood to be present on both sides of the vehicle, adjacent to the outboard surfaces of each rear fence. Although the static rear fence 1112 is shown in FIG. 19, it should be understood that embodiments of the active rear fences (e.g., active rear fence 1170 of FIG. 11B) can also provide a detachment zone when in the deployed configuration.

As shown in the drawings, an inboard edge of the blade portion of the rear fences of the proposed embodiments is positioned directly adjacent the rear window and/or panel 1160. It should be understood that although an inboard surface side 1930 of the blade portion 1116 is shown as being substantially straight or orthogonal relative to the rear panel 1160, in other embodiments, the inboard surface side 1930 can also include a curvature, such as a concave curved surface.

In different embodiments, the blade portion serves a barrier that blocks air from moving further inboard as it passes into the detachment zone 1920. In this example, for purposes of reference, the detachment zone 1920 is demarcated on one side by a dotted line 1960 that extends from the outboard end 1940 to the inboard end 1950 with a rounded or substantially convex curvature, and on the other side by the curved surface of the rear fence, referred to herein as a detachment surface 1902. In different embodiments, the detachment surface 1902 comprises the exterior surface of the first anchor portion 1114, referred to as a first detachment region 1904, and the outboard-facing surface of the first blade portion 1116, referred to as a second detachment region 1906. The two regions are identified as two separate segments for purposes of reference only. In other words, in different embodiments, it can be appreciated that the detachment surface 1902 comprises a substantially continuous and generally smooth exterior surface. In one example, detachment surface 1902 has a substantially concave shape. In some embodiments, the detachment zone 1920 has generally bulged or mound-shaped perimeter.

While the anchor portion of the rear fence is integrally joined with the blade portion in FIG. 19, thereby serving as a segment that bounds the detachment zone 1920 in FIG. 19, it should be understood that in other embodiments, the anchor portion may not be present, while the detachment zone 1902 remains. For example, in embodiments in which the anchor portion is abbreviated and/or removed, such that the blade portion of the rear fence extends distally outward as a separate component relative to the back panel of the vehicle, the detachment zone 1920 can be alternatively formed by the blade portion and the outboard portion of the vehicle directly adjacent to and outboard of the blade portion. In other words, in embodiments in which the back of the blade portion is fixedly attached (either as a dynamic component or static component) to the rear panel of the vehicle without any further structure, the second detachment region 1906 remains as shown in FIG. 19. In addition, the first detachment region 1902 can instead refer to a curved external surface of a different component that takes the place of the anchor portion.

Furthermore, the term "substantially continuous" should be understood to describe a surface that may have seams or small gaps between components, depending on an airflow pattern around the vehicle, but otherwise includes a continuous L-shaped surface. As represented schematically by an arrow, as airflow moves into the detachment zone 1920, the concave curved surface causes the air to become substantially 'dammed'. Some of the air can be redirected outward, away from the blade portion and vehicle, again reducing the impact of airflow.

With this arrangement, the rear fences according to the example embodiments described herein are deployed while the vehicle is moving at a predetermined speed to improve aerodynamic performance and are retracted or stowed when the vehicle is parked or operating at low speeds to improve styling appearance.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A vehicle comprising:
 a rearward-facing surface that extends along the vehicle width from a first rear pillar to a second rear pillar, the rearward facing surface extending a distance from an upper end and a lower end, the rearward-facing surface including:
  a first outboard region that is directly inboard relative to a first rear pillar, and
  a second outboard region that is directly inboard relative to a second rear pillar; and
 a rear fence including a blade portion positioned on the rearward-facing surface to extend rearward therefrom, wherein the blade portion is positioned inboard of the first outboard region, such that the blade portion is spaced apart from the first rear pillar, and the blade portion includes a first end positioned adjacent the upper end of the rearward-facing surface and a second end positioned at least a third of the distance from the upper end of the rearward-facing surface to the lower end.

2. The vehicle of claim 1, wherein the blade portion is positioned below a rearmost edge of a roof of the vehicle.

3. The vehicle of claim 2, further comprising a rear upper spoiler extending along the rearmost edge of the roof of the vehicle, and the blade portion includes a top edge that is disposed directly adjacent to an underside of the rear upper spoiler.

4. The vehicle of claim 3, wherein the first outboard region extends from a trailing edge of the first rear pillar to a boundary line extending downward from a transition point of the rear upper spoiler, the transition point corresponding to a point along a curved end portion of the rear upper spoiler at which the rear upper spoiler extends in a direction that is more horizontal than vertical.

5. The vehicle of claim 4, wherein the blade portion includes a bottom edge that is disposed inboard of the boundary line.

6. The vehicle of claim 1, wherein the blade portion includes a bottom edge that is fixedly attached to the rearward-facing surface such that the rear fence is static and has a width that is oriented in a substantially longitudinal direction.

7. The vehicle of claim 1, wherein the blade portion includes a bottom edge that is hingedly connected to the rearward-facing surface such that the rear fence can be rotated, transitioning the blade portion from a longitudinal orientation to a lateral orientation.

8. An aerodynamic assembly for a vehicle, the assembly comprising:
 a rear upper spoiler having an elongated body with an underside extending between a first end portion and a second end portion; and
 a first rear fence and a second rear fence, wherein the first rear fence and second rear fence are each positioned:

beneath the underside of the rear upper spoiler, and inboard relative to the two end portions of the rear upper spoiler.

9. The assembly of claim 8, wherein the first rear fence is inboard of and near to a first rearmost pillar of the vehicle and the second rear fence is inboard of and near to a second rearmost pillar of the vehicle.

10. The assembly of claim 8, wherein a width of the first rear fence extends in a direction aligned with a longitudinal axis of the vehicle.

11. The assembly of claim 8, wherein the first rear fence extends a distance from the underside that is at least a third of the distance down the rearward-facing surface.

12. The assembly of claim 8, wherein the vehicle includes a rearward-facing surface comprising a rear window disposed between a first side portion and a second side portion and the first rear fence is disposed on the first side portion.

13. The assembly of claim 12, wherein a blade portion of the first rear fence forms a substantially continuous assembly with the rear upper spoiler.

14. The assembly of claim 8, wherein the first rear fence includes a top edge that is adjacent to the underside of the rear upper spoiler, and the top edge has an outermost end that extends at least as far as a rearmost edge of the rear upper spoiler.

15. The assembly of claim 12, further comprising a substantially continuous outboard-facing exterior surface extending from an outboard end of the first rear fence to an inboard end of the first rear fence, the surface creating a detachment zone for damming airflow.

16. The assembly of claim 9, wherein the first rear fence is spaced apart from a trailing edge of the first rearmost pillar.

17. A method of re-directing airflow along a rearward-facing surface of a vehicle, the method comprising:
deploying a first rear fence that extends from a first side portion of the rearward-facing surface such that the first rear fence rotates from a first orientation to a second orientation;
establishing a first aerodynamic zone along the first side portion between the first rear fence and an underside of a rear spoiler; and
causing airflow to shift from a generally lateral direction to a substantially longitudinal direction as it moves through the first aerodynamic zone.

18. The method of claim 17, wherein the first rear fence is disposed below the underside of the rear spoiler.

19. The method of claim 17, wherein the first rear fence is inboard of a rearmost pillar of the vehicle.

20. The method of claim 17, further comprising a substantially continuous outboard-facing exterior surface extending from an outboard end of the first rear fence to an inboard end of the first rear fence, the surface creating a detachment zone for damming airflow.

* * * * *